(12) United States Patent
Amino

(10) Patent No.: US 11,479,695 B2
(45) Date of Patent: Oct. 25, 2022

(54) PEEL-OFF DETECTION LABEL

(71) Applicant: LINTEC CORPORATION, Itabashi-ku (JP)

(72) Inventor: Yumiko Amino, Funabashi (JP)

(73) Assignee: LINETEC CORPORATION, Itabashi-ku (JP)

( * ) Notice: Subject to any disclaimer, the term of this patent is extended or adjusted under 35 U.S.C. 154(b) by 0 days.

(21) Appl. No.: 17/258,640

(22) PCT Filed: Jul. 10, 2019

(86) PCT No.: PCT/JP2019/027242
§ 371 (c)(1),
(2) Date: Jan. 7, 2021

(87) PCT Pub. No.: WO2020/013211
PCT Pub. Date: Jan. 16, 2020

(65) Prior Publication Data
US 2021/0269681 A1    Sep. 2, 2021

(30) Foreign Application Priority Data
Jul. 11, 2018 (JP) .............................. JP2018-131857

(51) Int. Cl.
*C09J 7/38*    (2018.01)
*C09J 7/25*    (2018.01)
(Continued)

(52) U.S. Cl.
CPC ............ *C09J 7/385* (2018.01); *C09J 7/255* (2018.01); *C09J 7/29* (2018.01); *G09F 3/0376* (2013.01);
(Continued)

(58) Field of Classification Search
CPC .................................................. B32B 2307/54
See application file for complete search history.

(56) References Cited

U.S. PATENT DOCUMENTS
2005/0175823 A1    8/2005   Yu

FOREIGN PATENT DOCUMENTS
CN    102971144 A    3/2013
CN    106575491 A    4/2017
(Continued)

OTHER PUBLICATIONS

Machine translation of JP2004170776A (Year: 2004).*
(Continued)

*Primary Examiner* — Ian A Rummel
(74) *Attorney, Agent, or Firm* — Oblon, McClelland, Maier & Neustadt, L.L.P.

(57) ABSTRACT

The invention relates to a peel detection label that is a laminate including a support, a pattern layer formed in a part of the surface of the support, and a pressure-sensitive adhesive laminate having at least a low modulus layer (X), a high modulus layer (Y) and a pressure-sensitive adhesive layer (Z) in that order, in which the low modulus layer (X) has an n-layered structure (where n is an integer of 1 to 10) having a surface in contact with the support and the pattern layer and a surface in contact with the high modulus layer (Y), and the low modulus layer (X) satisfies a specific thickness-average shear storage elastic modulus.

14 Claims, 2 Drawing Sheets

(51) Int. Cl.
    *C09J 7/29*           (2018.01)
    *G09F 3/03*          (2006.01)
    *G09F 3/10*          (2006.01)
    *B65D 25/20*        (2006.01)
    *G09F 3/02*          (2006.01)

(52) U.S. Cl.
    CPC .............. *G09F 3/10* (2013.01); *B65D 25/205* (2013.01); *C09J 2203/338* (2013.01); *C09J 2301/122* (2020.08); *C09J 2433/006* (2013.01); *C09J 2467/006* (2013.01); *C09J 2475/006* (2013.01); *G09F 2003/023* (2013.01)

(56) References Cited

FOREIGN PATENT DOCUMENTS

| | | | |
|---|---|---|---|
| CN | 107924646 A | 4/2018 | |
| EP | 2 100 935 A1 | 9/2009 | |
| EP | 2280047 B1 * | 4/2012 | ............ C08F 212/08 |
| EP | 3 070 701 A | 9/2016 | |
| EP | 3 822 955 A1 | 5/2021 | |
| JP | 2003-84672 A | 3/2003 | |
| JP | 2003-345255 A | 12/2003 | |
| JP | 2004-170776 A | 6/2004 | |
| JP | 2004-177927 A | 6/2004 | |
| JP | 2004-285243 A | 10/2004 | |
| JP | 2007-155885 A | 6/2007 | |
| JP | 2010-281948 A | 12/2010 | |
| WO | WO 2019/039306 A1 | 2/2019 | |

OTHER PUBLICATIONS

International Search Report dated Sep. 17, 2019 in PCT/JP2019/027242 filed on Jul. 10, 2019, 2 pages.

Extended European Search Report dated May 13, 2022, in European Patent Application No. 19835125.6 (20 pages).

* cited by examiner

PEEL-OFF DETECTION LABEL

TECHNICAL FIELD

The present invention relates to a peel detection label.

BACKGROUND ART

For example, packages of a pharmaceutical product, a food product, and the like are required to have high security for safety, and a tampering prevention label is used for the purpose of confirming whether or not the package has been opened once. In addition, for the purpose of preventing tampering opening of filling containers of hazardous materials, such as a chemical vial and a fuel tank, sealed letters, decorated boxes, as well as the purpose of preventing unauthorized use of an identification photograph of an identification card, such as a passport, a tampering prevention label is used.

In addition, as for labels attached to expensive electronic devices, precision machine parts, for the purpose of preventing tampering of display contents or use for imitation means for peeling off a label of genuine products and attaching it to other products, a tampering prevention label is used.

For example, PTL 1 discloses a tampering prevention label or sheet composed of a polystyrene film having a thickness of 10 μm or more and 40 μm or less and a heat-resistant pressure-sensitive adhesive layer laminated on one surface thereof. The heat-resistant pressure-sensitive adhesive layer has a peel strength prescribed in JIS Z0237 of 15 N/25 mm or more at 80° C.

CITATION LIST

Patent Literature

PTL 1: JP 2010-281948 A

SUMMARY OF INVENTION

Technical Problem

According to the tampering prevention label or sheet described in PTL 1, when it is intended to peel the polystyrene film, the polystyrene film is broken to exhibit a tampering prevention function.

However, such a conventional peel detection label involved such a problem that in view of the fact that a part of the broken substrate layer or the pressure-sensitive adhesive layer remains on an adherend, the adherend is contaminated.

From the viewpoint of tampering prevention function, a peel detection label capable of definitely detecting presence or absence of peel even in a case of peeling a peel detection label at a lower speed is desired.

In view of the aforementioned circumstances, the present invention has been made, and an object thereof is to provide a peel detection label which is free from occurrence of adhesive residue onto an adherend and further which can exhibit excellent pattern expressibility even in peeling the peel detection label at a low speed.

Solution to Problem

The present inventors have found that the aforementioned problem can be solved by a peel detection label that is a laminate including a support, a pattern layer formed in a part of the surface of the support, and a pressure-sensitive adhesive laminate having at least a low modulus layer (X), a high modulus layer (Y) and a pressure-sensitive adhesive layer (Z) in that order, in which the low modulus layer (X) satisfies specific requirements.

Specifically, the present invention relates to the following [1] to [15].

[1] A peel detection label that is a laminate including a support, a pattern layer formed in a part of the surface of the support, and a pressure-sensitive adhesive laminate having at least a low modulus layer (X), a high modulus layer (Y) and a pressure-sensitive adhesive layer (Z) in that order, in which the low modulus layer (X) has an n-layered structure (where n is an integer of 1 to 10) having a surface in contact with the support and the pattern layer and a surface in contact with the high modulus layer (Y), and the thickness-average shear storage elastic modulus of the low modulus layer (X), as represented by the following expression (1), is $8.0 \times 10^4$ Pa or more and $6.0 \times 10^5$ Pa or less:

$$\sum_{k=1}^{n} (G'(Xk) \times T(Xk)) \quad (1)$$

wherein G'(Xk) represents a shear storage elastic modulus G' at 23° C. of the k'th layer (Xk) from the support side in the low modulus layer (X); T(Xk) represents a thickness ratio of the layer (Xk)=thickness of layer (Xk)/total thickness of low modulus layer (X); and n represents an integer of 1 to 10.

[2] The peel detection label according to the above [1], further satisfying the following requirement (1):

Requirement (1): On attaching the pressure-sensitive adhesive layer (Z) of the peel detection label onto an adherend and then peeling it from the adherend, interfacial peeling occurs between the support and the pattern layer, whereby the presence or absence of peeling of the peel detection label from the adherend becomes visually detectable.

[3] The peel detection label according to the above [1] or [2], wherein the tensile storage elastic modulus E' at 23° C. of the high modulus layer (Y) is 10 MPa or more and 800 MPa or less.

[4] The peel detection label according to any of the above [1] to [3], wherein the surface of the support on the side on which the pattern layer is formed is a surface subjected to satin finish processing.

[5] The peel detection label according to any of the above [1] to [4], wherein at least one of the surface of the low modulus layer (X) in contact with the support and the pattern layer and the surface thereof in contact with the high modulus layer (Y) has pressure-sensitive adhesiveness.

[6] The peel detection label according to any of the above [1] to [5], wherein the low modulus layer (X) is a laminate (L2) having at least a first layer (X1) and a second layer (X2), and the first layer (X1) is a layer in contact with the surface of the support and the pattern layer, and the second layer (X2) is a layer in contact with the high modulus layer (Y).

[7] The peel detection label according to the above [6], wherein the shear storage elastic modulus G' at 23° C. of the first layer (X1) constituting the low modulus layer (X) is larger than the shear storage elastic modulus G' at 23° C. of the second layer (X2).

[8] The peel detection label according to the above [6] or [7], wherein the ratio (X1t)/(X2t) of the thickness (X1t) of the first layer (X1) to the thickness (X2t) of the second layer (X2) that the low modulus layer (X) has is 1/100 to 200/100.

[9] The peel detection label according to any of the above [1] to [8], wherein the low modulus layer (X) has at least a pressure-sensitive adhesive layer (XA).

[10] The peel detection label according to the above [9], wherein the pattern layer and the pressure-sensitive adhesive layer (XA) each contain a same kind of resin.

[11] The peel detection label according to the above [9] or [10], wherein the pattern layer is a layer formed of a composition containing at least one selected from the group consisting of an acrylic resin, a urethane-based resin, an acrylic urethane-based resin, and a polyester-based resin, and the pressure-sensitive adhesive layer (XA) is a layer formed of a composition (x) containing a pressure-sensitive adhesive resin that includes one or more selected from the group consisting of an acrylic resin, a urethane-based resin, an acrylic urethane-based resin and a polyester-based resin.

[12] The peel detection label according to any of the above [1] to [11], wherein the high modulus layer (Y) is a layer formed of a composition (y) containing one or more non-pressure-sensitive adhesive resins (y1) selected from the group consisting of an acrylic urethane-based resin and an olefin-based resin.

[13] The peel detection label according to any of the above [1] to [12], wherein at least one layer selected from the low modulus layer (X), the high modulus layer (Y) and the pressure-sensitive adhesive layer (Z) is a layer containing a coloring agent.

[14] The peel detection label according to any of the above [1] to [13], wherein the ratio (Zt)/(Yt) of the thickness (Zt) of the pressure-sensitive adhesive layer (Z) to the thickness (Yt) of the high modulus layer (Y) is 10/100 to 500/100.

[15] The peel detection label according to any of the above [1] to [14], wherein the ratio (Xt)/(Yt) of the thickness (Xt) of the low modulus layer (X) to the thickness (Yt) of the high modulus layer (Y) is 20/100 to 500/100.

Advantageous Effects of Invention

In accordance with the present invention, there can be provided a peel detection label which is free from occurrence of adhesive residue onto an adherend and further which can exhibit excellent pattern expressibility even in peeling the peel detection label at a low speed.

DESCRIPTION OF EMBODIMENTS

Figure 1:
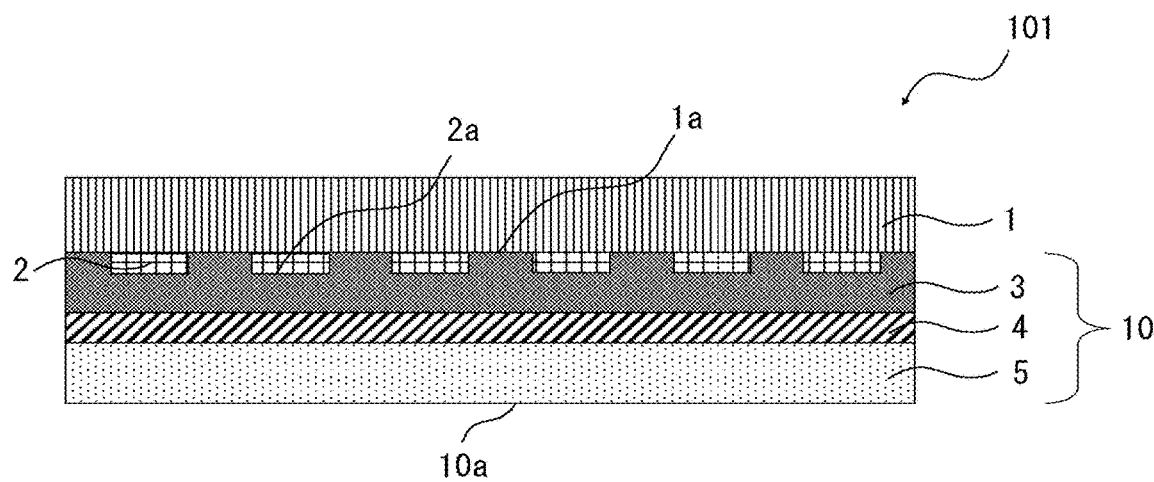
FIG. 1 is a cross-sectional schematic view of a peel detection label 101 showing an example of a configuration of the peel detection label of the present invention.

In the present invention, the judgement on whether the objective resin belongs to the "pressure-sensitive adhesive resin" or the "non-pressure-sensitive adhesive resin" is made on the basis of the following procedures (1) to (4).

Procedure (1): A resin layer having a thickness of 20 μm, which is formed of only the objective resin is provided on a polyethylene terephthalate (PET) film having a thickness of 50 μm and then cut in a size of 300 mm in length×25 mm in width, to prepare a test piece.

Procedure (2): The surface of the test piece on the side on which the resin layer is exposed is attached onto a stainless steel sheet (SUS304, polished with #360) in an environment at 23° C. and 50% RH (relative humidity), followed by allowing to stand for 24 hours in the same environment.

Procedure (3): After allowing to stand, a peel strength is measured in an environment at 23° C. and 50% RH (relative humidity) by the 180° peeling method on the basis of JIS Z0237:2000 at a peeling speed of 300 mm/min.

Procedure (4): When the measured peel strength is 0.1 N/25 mm or more, the objective resin is judged as the "pressure-sensitive adhesive resin". On the other hand, when the measured peel strength is less than 0.1 N/25 mm, the objective resin is judged as the "non-pressure-sensitive adhesive resin".

In the present invention, the wording "active component" refers to a component resulting from removing a diluent solvent from the components contained in the objective composition.

In the present invention, the wording "peeling of the peel detection label" means peeling from an adherend, and for example, in the case where the peel detection label has a release material on the attachment surface of the pressure-sensitive adhesive layer (Z) of the peel detection label, it does not mean a peeling operation at the time of peeling the peel detection label from the release material. Namely, in the case where the peel detection label has the release material, the wording means a peeling operation at the time of peeling the peel detection label from an adherend after the peel detection label, from which the release material was removed, has been attached to the adherend.

In the present invention, the "adherend" referred to in the requirement (1) means an adherend to be used in evaluating one characteristic of the peel detection label, that is, whether or not the peel detection label satisfies the requirement (1), i.e., the "adherend" is used for merely explaining the evaluation method. The "adherend" can be said to be similar to, for example, an object generally used in evaluating "the peel strength" of a label that is attached to the object, or a glass plate generally used in observing a substance under a digital microscope for preparing a preparation. Accordingly, the "adherend" described in the requirement (1) is not a part (a member) to constitute the peel detection label of the present invention. In addition, the "adherend" does not specify an object to which the peel detection label of the present invention is to be attached to a specific one.

Further, in the present invention, the wording "visually detectable" referred to herein means that a change of the peel detection label before and after the peeling thereof can be confirmed by human eyes.

In the present invention, for example, the wording "(meth)acrylic acid" indicates both "acrylic acid" and "methacrylic acid", and the same is also applicable to analogous terminologies.

The mass average molecular weight (Mw) is a value expressed in terms of standard polystyrene, which is measured by the gel permeation chromatography (GPC) method. Specifically, it is a value as measured on the basis of the method described in the section of Examples.

With respect to preferred numerical value ranges (for example, a range of content), lower limit values and upper limit values as described incrementally can be independently combined, respectively. For example, from the description "preferably 10 to 90, and more preferably 30 to 60", the wording "preferred lower limit value (10)" and the wording "more preferred upper limit value (60)" can be combined to designate "10 to 60". Similarly, for example, from the description "preferably 10 or more, and more preferably 30 or more, and preferably 90 or less, and more preferably 60 or less", the wording "10 or more and 60 or less" can also be selected as a preferred range. In addition, merely the range "60 or less" can be selected, too.

[Peel Detection Label]

The peel detection label of the present invention is a peel detection label that is a laminate including a support, a pattern layer formed in a part of the surface of the support, and a pressure-sensitive adhesive laminate having at least a low modulus layer (X), a high modulus layer (Y) and a pressure-sensitive adhesive layer (Z) in that order, in which the low modulus layer (X) has an n-layered structure (where n is an integer of 1 to 10) having a surface in contact with the support and the pattern layer and a surface in contact with the high modulus layer (Y), and the thickness-average shear storage elastic modulus of the low modulus layer (X), as represented by the following expression (1), is $8.0 \times 10^4$ Pa or more and $6.0 \times 10^5$ Pa or less:

$$\sum_{k=1}^{n} (G'(Xk) \times T(Xk)) \quad (1)$$

wherein G'(Xk) represents a shear storage elastic modulus G' at 23° C. of the k'th layer (Xk) from the support side in the low modulus layer (X); T(Xk) represents a thickness ratio of the layer (Xk)=thickness of layer (Xk)/total thickness of low modulus layer (X); and n represents an integer of 1 to 10.

In the case where the foregoing peel detection label satisfies the aforementioned layer configuration, a peel detection label which is free from occurrence of adhesive residue onto an adherend is provided. Furthermore, in the case where the thickness-average shear storage elastic modulus of the low modulus layer (X), as represented by the aforementioned expression (1), is $8.0 \times 10^4$ Pa or more and $6.0 \times 10^5$ Pa or less, the peel detection label can exhibit excellent peel detection performance even when it is peeled at a low speed.

Preferred examples of the peel detection label according to embodiments of the present invention are hereunder described by reference to FIGS. 1 to 3, but it should be construed that the peel detection label of the present invention is not limited to the following examples so long as the effects of the present invention are achieved.

FIG. 1 is a cross-sectional schematic view of a peel detection label 101 showing an example of a configuration of the peel detection label of the present invention.

For example, as in the peel detection label 101 shown in FIG. 1, a preferred example of the peel detection label of the present invention is one in which a support 1, a pattern layer 2, and a pressure-sensitive adhesive laminate 10 are laminated in that order. The pressure-sensitive adhesive laminate 10 in FIG. 1 is one prepared by laminating a low modulus layer (X) (hereinafter also referred to as "layer (X)") 3, a high modulus layer (Y) (hereinafter also referred to as "layer (Y)") 4, and a pressure-sensitive adhesive layer (Z) (hereinafter also referred to as "layer (Z)") 5 in that order from the side of the pattern layer 2.

In the case where the peel detection label of the present invention is an embodiment as in the peel detection label 101 shown in FIG. 1, it may be an embodiment in which the layer (X) 3 is in contact with the surface 1*a* of the support 1 on the side on which the pattern layer 2 is formed and in contact with the pattern layer 2; preferably it may be an embodiment in which the layer (X) 3 is in contact with the surface 1*a* of the support 1 on the side on which the pattern layer 2 is formed and in contact with the surface 2*a* of the pattern layer 2 on the side opposite to the side of the support 1; more preferably it may be an embodiment, like the peel detection label 101 shown in FIG. 1, in which the layer (X) 3 is in contact with the surface 1*a* of the support 1 on the side on which the pattern layer 2 is formed and covers the other surface than the surface of the pattern layer 2 that is in contact with the surface 1*a* of the support 1; and even more preferably, in the pressure-sensitive adhesive laminate 10, the layer (X) 3, the layer (Y) 4 and the layer (Z) 5 are in direct lamination in that order.

Here, the "direct lamination" means that, for example, in the case of the peel detection label 101 shown in FIG. 1, the layer (X) 3 and the layer (Y) 4 are in direct lamination without any other layer therebetween, and also the layer (Y) 4 and the layer (Z) 5 are in direct lamination without any other layer therebetween. Specifically, in the case of the peel detection label 101 shown in FIG. 1, this configuration means a lamination state where the layer (X) 3, the layer (Y) 4, and the layer (Z) 5 are in direct lamination without any other layer between the layer (X) 3 and the layer (Y) 4 and between the layer (Y) 4 and the layer (Z) 5.

Figure 2:
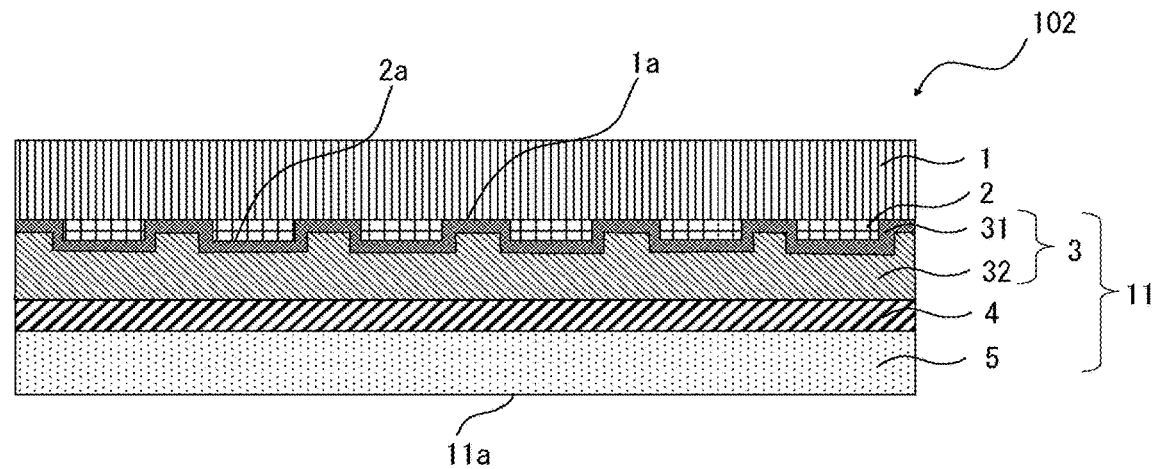
FIG. 2 is a cross-sectional schematic view of a peel detection label 102 showing an example of a configuration of the peel detection label of the present invention.

FIG. 2 is a cross-sectional schematic view of a peel detection label 102 showing an example of a configuration of the peel detection label of the present invention.

For example, one preferred example of the peel detection label of the present invention includes a peel detection label 102 shown in FIG. 2, in which a support 1, a pattern layer 2, and a pressure-sensitive adhesive laminate 11 are laminated in that order. The pressure-sensitive adhesive laminate 11 in FIG. 2 includes a low modulus layer (X) 3 composed of a first layer (X1) (hereinafter also referred to as "layer (X1)") 31 and a second layer (X2) (hereinafter also referred to as "layer (X2)") 32 from the side of the pattern layer 2, a high modulus layer (Y) 4 and a pressure-sensitive adhesive layer (Z) 5, as laminated in that order.

In the layer (X) 3, the layer (X1) 31 and the layer (X2) 32 to constitute the layer (X) 3 exist in the order of the layer (X1) 31 and the layer (X2) 32 from the side of the support 1.

In this description, as described for the aforementioned expression (1), of the layers constituting the low modulus layer (X) 3, the k'th layer from the side closest to the support is referred to as a layer (Xk).

In the case of the embodiment of the peel detection label 102 shown in FIG. 2, it may be an embodiment in which the layer (X1) 31 in the low modulus layer (X) 3 is in contact with the surface 1*a* of the support 1 on the side on which the pattern layer 2 is formed and in contact with the pattern layer 2; preferably it may be an embodiment in which the layer (X1) 31 is in contact with the surface 1*a* of the support 1 on the side on which the pattern layer 2 is formed and in contact with the surface 2*a* of the pattern layer 2 on the side opposite to the side of the support 1; more preferably it may be an embodiment, like the peel detection label 102 shown in FIG. 2, in which the layer (X1) 31 is in contact with the surface 1a of the support 1 on the side on which the pattern layer 2 is formed and covers the other surface than the surface of the pattern layer 2 that is in contact with the surface 1a of the support 1; and even more preferably, in the pressure-sensitive adhesive laminate 11, the layer (X) 3, the layer (Y) 4 and the layer (Z) 5 are in direct lamination in that order.

In the peel detection labels 101 and 102 of the embodiments shown in FIG. 1 and FIG. 2, the adhesive surface of the layer (Z) 5 works as an adhesive surface 10a or 11a of the pressure-sensitive adhesive laminate, and the label is attached to an adherend via the adhesive surface.

Figure 3:
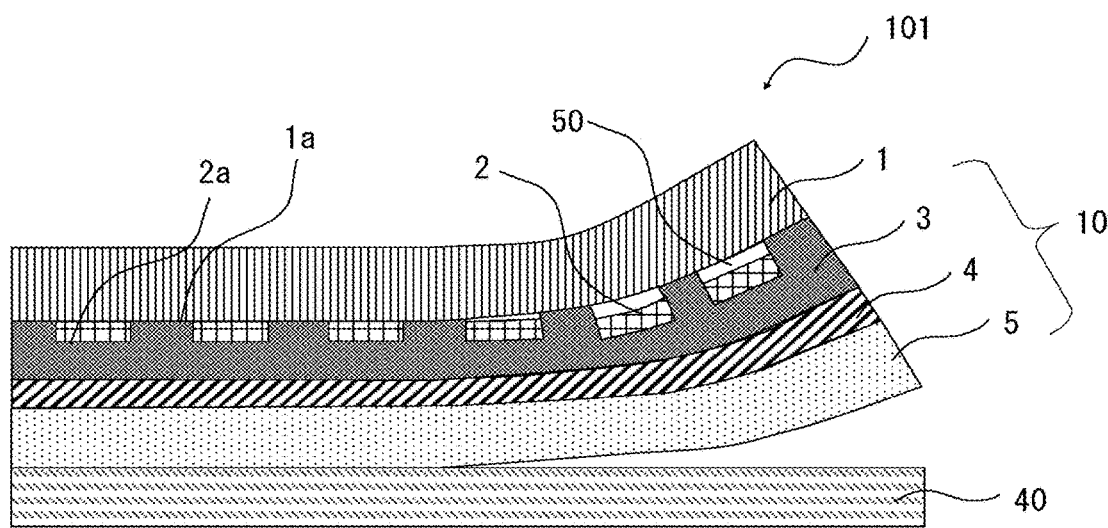
FIG. 3 is a cross-sectional schematic view showing the state on the way of peeling a peel detection label 101 that is an example of a configuration of the peel detection label of the present invention from an adherend 40.

FIG. 3 is a cross-sectional schematic view showing the state on the way of attaching the peel detection label 101 shown in FIG. 1 onto an adherend 40 and then peeling it from the adherend 40, namely the state of peeling the peel detection label 101.

In the peel detection label of one preferred embodiment of the present invention, on peeling the peel detection label, there occurs interfacial peeling between the support and the pattern layer and/or between the pattern layer and the low modulus layer (X) to thereby enable visual detection of presence or absence of peeling of the peel detection label. Here, as shown in FIG. 3, the peel detection label of the present invention is preferably a label in which on peeling the peel detection label 101 from the adherend 40, interfacial peeling occurs between the support 1 and the pattern layer 2 to form a void 50, whereby a pattern is actualized, and whether or not the peel detection label 101 has peeled from the adherend 40 becomes visually detectable. That is, the peel detection label preferably satisfies the embodiment of the following requirement (1).

Requirement (1): On attaching the peel detection label onto an adherend and then peeling it from the adherend, interfacial peeling occurs between the support and the pattern layer, whereby the presence or absence of peeling of the peel detection label from the adherend becomes visually detectable.

The peel detection label of the present invention satisfying the requirement (1) is preferred from the following viewpoint. For example, in the case where the surface of the support on the side of the pattern layer has been subjected to satin finish processing, as will be described hereinunder regarding the support, and when there occur voids in the peel part caused by interfacial peeling between the support and the pattern layer, light may diffusely reflect on the satin finish-processed surface having been exposed out in the voids, whereby the peeled place changes from transparent to semitransparent or opaque before and after peeling, or a matte pattern can be formed. According to this, visibility on detecting peeling of the peel detection label is improved furthermore.

As another embodiment of the aforementioned peel detection label, for example, in the case of the peel detection label 101 shown in FIG. 1, a configuration in which a release material (not illustrated) is further laminated on at least one surface selected from the surface of the support 1 on the opposite side to the layer (Z) 5 of the pressure-sensitive adhesive laminate 10 and the adhesive surface (the surface of the layer (Z) 5 on the side opposite to the side in contact with the layer (Y) 4) 10a of the pressure-sensitive adhesive laminate 10 may also be adopted. The same may apply to the peel detection label 102 shown in FIG. 2.

In addition, as still another embodiment of the aforementioned peel detection label, for example, in the case of the peel detection label 101 shown in FIG. 1, a configuration in which a pressure-sensitive adhesive layer (Wt) (not illustrated) which is formed of a composition different from that of the layer (Z) is further laminated on the adhesive surface 10a of the pressure-sensitive adhesive laminate may also be adopted. t represents an integer of 1 or more. In the case where the configuration has plural layers (Wt), one having a smaller number of t of Wt is a layer (Wt) nearer to the layer (Z). Namely, in the case where the configuration has plural layers (Wt), the layer (Wt) nearest to the layer (Z) is a layer (W1). The same may apply to the peel detection label 102 shown in FIG. 2.

As still another embodiment of the aforementioned peel detection label, a configuration in which an intermediate layer (M) (not illustrated) (for example, a primer layer, a metallic vapor deposited film, or a non-pressure-sensitive adhesive colored layer) which is formed of a composition as a different forming material is laminated between the layer (Y) and the layer (Z) may also be adopted.

As mentioned above, it should be construed that the peel detection label of the present invention is not limited to these embodiments so long as the effects of the present invention are attained.

A thickness of the peel detection label is preferably 5 to 150 μm, more preferably 10 to 100 μm, still more preferably 20 to 80 μm, and yet still more preferably 25 to 70 μm. Here, in the case where the foregoing peel detection label is the embodiment in which the release material is further laminated as mentioned above, the thickness of the peel detection label refers to a total thickness of the peel detection label excluding the release material.

The thickness of the peel detection label can be measured by the method described in the section of Examples.

The peel strength of the adhesive surface of the peel detection label which is brought into contact with an adherend, as measured according to a 180°-peel method at a peeling speed of 300 mm/min described in the section of Examples, is preferably 0.5 N/25 mm or more, more preferably 1.0 N/25 mm or more, still more preferably 3.0 N/25 mm or more, yet still more preferably 4.0 N/25 mm or more, and even yet still more preferably 5.0 N/25 mm or more, and it is preferably 40.0 N/25 mm or less, more preferably 30.0 N/25 mm or less, still more preferably 25.0 N/25 mm or less, yet still more preferably 20.0 N/25 mm or less, and even yet still more preferably 15.0 N/25 mm or less.

The peel strength of the adhesive surface of the peel detection label which is brought into contact with an adherend, as measured according to a 90°-peel method at a peeling speed of 300 mm/min described in the section of Examples, is preferably 0.5 N/25 mm or more, more preferably 1.0 N/25 mm or more, still more preferably 3.0 N/25 mm or more, yet still more preferably 4.0 N/25 mm or more, and even yet still more preferably 4.5 N/25 mm or more, and it is preferably 40.0 N/25 mm or less, more preferably 30.0 N/25 mm or less, still more preferably 20.0 N/25 mm or less, yet still more preferably 15.0 N/25 mm or less, and even yet still more preferably 10.0 N/25 mm or less.

The peel strength of the adhesive surface of the peel detection label which is brought into contact with an adherend, as measured according to a 90°-peel method at a peeling speed of 50 mm/min described in the section of Examples, is preferably 0.5 N/25 mm or more, more preferably 1.0 N/25 mm or more, still more preferably 2.0 N/25 mm or more, yet still more preferably 2.5 N/25 mm or more, and even yet still more preferably 3.0 N/25 mm or more, and it is preferably 30.0 N/25 mm or less, more preferably 20.0 N/25 mm or less, still more preferably 15.0 N/25 mm or less, yet still more preferably 10.0 N/25 mm or less, and even yet still more preferably 8.0 N/25 mm or less.

The peel strength of the adhesive surface of the peel detection label which is brought into contact with an adherend, as measured according to a 90°-peel method at a peeling speed of 10 mm/min described in the section of Examples, is preferably 0.3 N/25 mm or more, more preferably 0.5 N/25 mm or more, still more preferably 1.0 N/25 mm or more, yet still more preferably 1.5 N/25 mm or more, and even yet still more preferably 2.0 N/25 mm or more, and it is preferably 30.0 N/25 mm or less, more preferably 20.0 N/25 mm or less, still more preferably 15.0 N/25 mm or less, yet still more preferably 10.0 N/25 mm or less, even yet still more preferably 8.0 N/25 mm or less, even yet still more preferably 7.0 N/25 mm or less, and even yet still more preferably 6.0 N/25 mm or less.

The value of the peel strength of the peel detection label can be measured by the method described in the section of Examples.

As for the peel detection label that is a preferred embodiment of the present invention, as mentioned above, at the time of peeling of the peel detection label, interfacial peeling occurs between the support and the pattern layer, and/or between the pattern layer and the layer (X), whereby the presence or absence of peeling of the peel detection label becomes visually detectable. In consequence, the peel detection label is preferably a peel detection label having transparency to an extent such that on attaching the peel detection label onto the adherend, at least a change to be caused due to the interfacial peeling is visually recognizable from the support side of the peel detection label; and more preferably a peel detection label having transparency to an extent such that information on the adherend is visually recognizable. That is, it is more preferred that the peel detection label is see-through, and from the surface side of the peel detection label on the support side, an arbitrary substance existent on the other surface side of the peel detection label is visually seen.

Each of the members configuring the peel detection label is hereunder described in more detail.

<Support>

As described above, the peel detection label of one preferred embodiment of the present invention provides interfacial peeling between the pattern layer and the other layer upon peeling the peel detection label, thereby enabling visual detection of presence or absence of peeling of the peel detection label.

Accordingly, the support is preferably a transparent support in such a degree that, when the support is assembled in the peel detection label, the support is transparent so that an arbitrary object existing on the side of the other surface of the support is visually detectable from the side of the surface of the support of the peel detection label.

Also preferably, the surface of the support on the side on which the pattern layer is formed is a surface having been subjected to satin finish processing. Here, the satin finish processing refers to a treatment for processing the surface of the support into a surface having fine concaves and convexes, and the satin-finished surface is in general a rough surface as in a surface of pear peel. In this description, the "satin-finished surface" may be in a shape in which the fine concave-convex surface is irregular or regular.

When the surface of the support on the side on which the pattern layer is formed is a satin-finished surface, interfacial adhesion to the layer (X) to be mentioned hereinunder is improved, and occurrence of interfacial peeling on such an interface can be effectively prevented, and hence, such is preferred. With that, interfacial peeling can readily occur in the interface between the support and the pattern layer exists but not in the interface between the pattern layer and the layer (X), and hence, such is preferred. Namely, the aforementioned requirement (1) can be readily satisfied, and hence, such is preferred.

For example, as described above, in the case where one surface of the support is subjected to satin finish processing, when interfacial peeling occurs between the support and the pattern layer to form a void in a peeled portion, light reflects diffusely on the satin-finished surface exposed to the void, whereby the peeled place changes from transparent to semi-transparent or opaque before and after peeling, or a matte pattern can be formed. According to this, visibility on detecting peeling of the peel detection label is improved, and hence, such is preferred.

Therefore, a support which has transparency such that the presence or absence of peeling of the peel detection label becomes visually detectable, and in which the surface on the side on which the pattern layer is formed is a satin-finished surface, is more preferred.

As the support, for example, a transparent plastic film is preferably used. Examples of a material of the plastic film include an acrylic resin, such as a pol(meth)acrylate; a polyamide, such as a wholly aromatic polyamide, nylon 6, nylon 66, and a nylon copolymer; a polyester-based resin, such as polyethylene terephthalate, polybutylene terephthalate, polyethylene naphthalate, and a polyarylate; a polyurethane-based resin, such as polyurethane acrylate; a polyethylene-based resin; a polypropylene-based resin; poly(4-methylpentene-1); a polyvinyl chloride-based resin; a polyvinylidene chloride-based resin; a polyvinyl alcohol-based resin; an ethylene-vinyl acetate copolymer; a polystyrene-based resin; a polycarbonate-based resin; a norbornene-based resin; and a cycloolefin resin. Of these, from the standpoint of transparency, costs, and versatility, a polyamide and a polyester-based resin are preferred, and polyethylene terephthalate is more preferred.

Examples of the satin finish processing include emboss processing using an emboss roll having a satin-finished surface, sandblast processing (sand mat processing), plasma processing, chemical etching processing with a solvent, kneading processing of transparent fine resin particles, and fine concave-convex processing by means of coating processing of a mat material. Of these, from the viewpoint of costs and versatility, emboss processing using an emboss roll having a satin-finished surface or sandblast processing is preferred, and sandblast processing is more preferred.

In consequence, as the support, a polyamide film or a film using a polyester-based resin as the material, each having a surface such that the surface of the support on the side on which the pattern layer is formed is subjected to satin finish processing, is more preferred, and a polyethylene terephthalate film having a surface such that the surface of the support on the side on which the pattern layer is formed is subjected to satin finish processing is still more preferred.

A thickness of the support is preferably 1 to 150 μm, more preferably 5 to 130 μm, still more preferably 10 to 80 μm, yet still more preferably 20 to 60 μm, and even yet still more preferably 30 to 50 μm.

The thickness of the support can be measured by the method described in the section of Examples.

For the purpose of designability or forgery prevention, a printing receiving layer may be provided on the surface of the support at the opposite side to the pressure-sensitive adhesive laminate, thereby providing a printing layer so long as the effects of the present invention are attained, namely so as not to impair the transparency of the peel detection label to an extent such that a change to be caused due to the interfacial peeling is visually recognizable. In addition, in order to provide a winding tape, a release material layer may be provided at the opposite side of the support to the pressure-sensitive adhesive laminate so long as the effects of the present invention are attained.

<Pattern Layer>

The pattern layer is a layer which is necessary for making it possible to visually detect the matter that at the time of peeling of the peel detection label, the peel detection label has been peeled.

Preferably, the pattern layer is a layer formed of a material satisfying the requirement (1) in the peel detection label.

As for the pattern layer, since it is preferred that the pattern is a latent pattern before peeling of the peel detection label, the pattern layer is preferably a layer with transparency. What a pattern layer with transparency is provided is preferred from the viewpoint that the change before and after peeling of the peel detection label becomes distinct; in a state that the peel detection label is attached onto the adherend, it becomes possible to confirm information regarding a letter or a design on the adherend surface through the peel detection label; or the peel detection label itself becomes transparent, so that the label can be made not conspicuous.

Although the pattern layer is not particularly limited so long as the advantageous effects of the present invention can be expressed, it is preferably a layer formed of a composition containing at least one selected from the group consisting of a cellulose-based resin, such as methyl cellulose, carboxymethyl cellulose, and hydroxyethyl cellulose, an acrylic resin, such as a poly(meth)acrylate and polymethyl (meth)acrylate, a urethane-based resin, an acrylic urethane-based resin, a polyester-based resin, such as polyethylene terephthalate, polybutylene terephthalate, polyethylene naphthalate, and a polyarylate, and an epoxy-based resin; more preferably a layer formed of a composition containing at least one selected from the group consisting of an acrylic resin, a urethane-based resin, an acrylic urethane-based resin, and a polyester-based resin; still more preferably a layer formed of a composition containing at least one selected from the group consisting of an acrylic resin and an acrylic urethane-based resin; and yet still more preferably a layer formed of a composition readily containing an acrylic resin.

From the viewpoint of readily satisfying the requirement (1), the pattern layer is preferably a layer formed of a resin having a peel strength lower than the peel strength of the layer (X) (in the case where the layer (X) is formed of plural layers, the layer (X1) in contact with the pattern layer), and more preferably a layer formed of a non-pressure-sensitive adhesive resin.

Therefore, the layer formed of the composition containing an acrylic resin is preferably a layer formed of an acrylic resin capable of forming a layer having the peel strength lower than that of the resin to be used for the layer (X) among acrylic resins as mentioned later, and more preferably a layer formed of a composition containing an acrylic polymer in which a principal monomer is methyl (meth)acrylate.

Here, the "principal monomer" refers to a monomer component having the highest content (use amount) in the monomer components forming the polymer.

From the viewpoint that at the time of peeling of the peel detection label, interfacial peeling occurs more readily between the support and the pattern layer, and the requirement (1) is readily satisfied, it is preferred that the adhesive strength between the pattern layer and the support is lower than the adhesive strength between the layer (X) (in the case where the layer (X) is formed of plural layers, the layer (X1) in contact with the pattern layer) and the support; and it is more preferred that the adhesive strength between the pattern layer and the support is lower than the adhesive strength between the layer (X) and the support and lower than the adhesive strength between the pattern layer and the layer (X). According to such an embodiment, for example, the occurrence of peeling at interfaces other than the interface between the support and the pattern layer can be effectively prevented and the requirement (1) can be satisfied, and hence, such is preferred.

In the pattern layer, the total content of the aforementioned respective resins is preferably 50% by mass or more, more preferably 70% by mass or more, still more preferably 80% by mass or more, and yet still more preferably 90% by mass or more, and it is preferably 100% by mass or less.

The pattern layer is formed in a part of the surface of the support. In the case where the pattern layer is formed on the entire surface of the support, peeling occurs on the entire surface of the interface between the support and the pattern layer, whereby adhesive residue onto the adherend occurs.

Here, the words "the pattern layer is formed in a part of the surface of the support" mean that, in the peel detection label having a size in a state of being actually attached, or after die cutting in a predetermined size for use, the area where the pattern layer is formed may be less than 100%, preferably 1 to 99%, more preferably 2 to 95%, still more preferably 3 to 90%, yet still more preferably 5 to 80%, even yet still more preferably 8 to 70%, even still more preferably 10 to 60%, and even still more further preferably 12 to 45% of the area (100%) of the surface of the support on which the pattern layer is formed.

A formation method of the pattern layer is not particularly limited so long as it is a method capable of forming the pattern layer on the support. For example, the pattern layer can be formed using an ink containing the aforementioned resin and a solvent by a general printing method, for example, gravure printing, screen printing, offset printing, or flexographic printing.

The shape of the pattern to be formed is not particularly limited so long as the presence or absence of peeling of the peel detection label is detectable, and it may be a geometric pattern or design, or may be a letter pattern.

The foregoing pattern is not always limited to "arrangement" based on definite regularity but also includes an irregular (random) shape. For example, not limiting to printing of a specified regular shape by the aforementioned printing method, when performing the processing so as to provide an irregular (random) shape by merely spraying raw materials for pattern layer on the support even in the case where a random change of color tone or light permeability of the label can be visually recognized in a partial portion, the portion formed of the raw materials for pattern layer formed on the support is included in the pattern layer.

However, from the viewpoint of production and product quality, such as the viewpoint of detecting more surely and definitely the presence or absence of peeling of the peel detection label and the viewpoint that when processed in any label size, the pattern layer suited for that size can be formed, it is preferred that an interface between the support and the pattern layer is existent in more than a certain area, and hence, it is preferred to form a predetermined regular pattern.

As mentioned above, it is possible for the pattern layer itself to form a predetermined pattern, and therefore, in the case where the pattern layer is a layer with transparency, the pattern can be formed as a latent pattern, such as a latent letter. Here, the "latent pattern" refers to a pattern which is latent and cannot be visually detected because the formed pattern is transparent before peeling of the peel detection label, and can be visually detected because the pattern is actualized after peeling of the peel detection label.

In the case where the requirement (1) is satisfied, the pattern layer which is used in the present invention has an advantage such that for example, there is no need to provide a pattern layer including layers having different functions such as a peel layer and a printing layer, because the pattern layer which is used in the present invention itself undergoes interfacial peeling from the support.

By providing the aforementioned configuration of the peel detection label of the present invention, causing interfacial peeling between the support and the pattern layer, whereas the interfacial peeling in other portions can be effectively suppressed. Therefore, even in the case where a pattern having a comparatively complicated shape as in letters is formed by the pattern layer itself, on peeling of the peel detection label, it becomes possible to express the pattern to a visually detectable extent, and consequently, a configuration of the peel detection label satisfying the requirement (1) is preferred.

A thickness of the pattern layer may be less than a thickness of the pressure-sensitive adhesive laminate as mentioned later, and is preferably less than the thickness of the low modulus layer (X). The thickness of the pattern layer is, for example, preferably 0.05 to 16 µm, more preferably 0.1 to 12 µm, and still more preferably 0.5 to 8 µm.

The thickness of the pattern layer can be measured by the method described in the section of Examples.

<Pressure-Sensitive Adhesive Laminate>

The pressure-sensitive adhesive laminate is a pressure-sensitive adhesive laminate having the low modulus layer (X), the high modulus layer (Y) and the pressure-sensitive adhesive layer (Z) as laminated in that order, and is preferably a pressure-sensitive adhesive laminate having the low modulus layer (X), the high modulus layer (Y) and the pressure-sensitive adhesive layer (Z) as laminated directly in that order.

<<Low Modulus Layer (X)>>

The low modulus layer (X) has an n-layered structure (where n is an integer of 1 to 10) having a surface in contact with the support and the pattern layer and a surface in contact with the high modulus layer (Y), and the thickness-average shear storage elastic modulus of the low modulus layer (X), as represented by the following expression (1), is $8.0 \times 10^4$ Pa or more and $6.0 \times 10^5$ Pa or less:

$$\sum_{k=1}^{n} (G'(Xk) \times T(Xk)) \quad (1)$$

wherein G'(Xk) represents a shear storage elastic modulus G' at 23° C. of the k'th layer (Xk) from the support side in the low modulus layer (X); T(Xk) represents a thickness ratio of the layer (Xk)=thickness of layer (Xk)/total thickness of low modulus layer (X); and n represents an integer of 1 to 10.

When the layer (X) satisfies the thickness-average shear storage elastic modulus as above (hereinafter also simply referred to as "thickness-average elastic modulus"), excellent pattern expressibility can be exhibited even in the case where the peel detection label is peeled at a low speed.

The reason why the effect is expressed can be considered to be because, on peeling the peel detection label, the pressure-sensitive adhesive layer (X) does not break but can be sufficiently deformed and along with the deformation of the pressure-sensitive adhesive layer (X), the pattern layer is pulled so that there may readily occur interfacial peeling between the support and the pattern layer. With that, when the thickness-average elastic modulus of the layer (X) satisfies the aforementioned range, there may also occur interfacial peeling between the support and the pattern layer even in the case where the peel detection label is peeled at a low speed and therefore a suitable tensile stress can be generated in the interface and, as a result, more excellent pattern expressibility can be thereby provided.

From the viewpoint of exhibiting more excellent pattern expressibility even in the case where the peel detection label is peeled at a low speed, the thickness-average elastic modulus of the layer (X) is preferably $9.0 \times 10^4$ Pa or more, more preferably $9.5 \times 10^4$ Pa or more, even more preferably $1.0 \times 10^5$ Pa or more, further more preferably $1.1 \times 10^5$ Pa or more and is preferably $5.0 \times 10^5$ Pa or less, more preferably $3.0 \times 10^5$ Pa or less, even more preferably $2.0 \times 10^5$ Pa or less, further more preferably $1.5 \times 10^5$ Pa or less.

As known from the expression (1), the thickness-average elastic modulus of the layer (X) can be controlled, for example, by controlling the shear storage elastic modulus G' at 23° C. of each layer constituting the layer (X) and the thickness of each layer. With that, the shear storage elastic modulus G' at 23° C. of each layer constituting the layer (X) can be controlled, for example, by controlling the choice of the kind of each component such as the resin to form the layer, the tackifier, the crosslinking agent, the curing agent and other additives, and by controlling the content of each component. The same may also apply to the case where the layer (X) is a single layer.

A value of the thickness-average elastic modulus of the layer (X) can be measured and calculated specifically according to the method described in the section of Examples.

The layer (X) may be a single layer or may also be a laminate (Ln) formed of 2 or more layers.

In the case where the layer (X) is a laminate (Ln) formed of 2 or more layers, the laminate (Ln) has at least a layer (X1) that is the first layer from the support side and a layer (Xn) that is the n'th layer from the support side, in which the layer (X1) is a layer in contact with the surface of the support and the pattern layer, and the layer (Xn) is a layer in contact with the high modulus layer (Y).

In the case where the layer (X) is a laminate (Ln), n represents an integer of 2 to 10, and n is preferably an integer of 2 to 6, more preferably an integer of 2 to 4, even more preferably an integer of 2 or 3, further more preferably 2.

Accordingly, in the case where the layer (X) is a laminate (Ln), more preferably, the laminate is preferably a laminate (L2) having a layer (X1) and a layer (X2) in which the layer (X1) is a layer in contact with the surface of the support and the pattern layer and the layer (X2) is a layer in contact with the high modulus layer (Y).

In the case where the layer (X) is a laminate (Ln), more preferably, the shear storage elastic modulus G' at 23° C. of the layer (X1) is larger than the shear storage elastic modulus G' at 23° C. of the layer (Xn). For example, in the case where the laminate (Ln) is a laminate (L2) composed of 2 layers, preferably, the shear storage elastic modulus G' at 23° C. of the layer (X1) is larger than the shear storage elastic modulus G' at 23° C. of the layer (X2).

Preferably, each layer constituting the layer (X) is a resin layer formed of a resin composition containing a resin. Specifically, the layer (X) is preferably a layer formed of a resin layer.

Also preferably, the layer (X) is such that at least one surface of the surface of the layer (X) in contact with the support and the pattern layer or the surface thereof in contact with the high modulus layer (Y) has pressure-sensitive adhesiveness. Accordingly, the layer (X) preferably has at least a pressure-sensitive adhesive layer (XA) (hereinafter also referred to as "layer (XA)").

The layer (XA) is preferably a layer formed of a pressure-sensitive adhesive resin-containing composition (x), more preferably a layer formed by drying a coating film (x') formed of a pressure-sensitive adhesive resin-containing composition (x).

Here, in this description, "coating film" is a film formed of a composition of a forming material according to a known coating method, and is in such a state that the residual ratio of the volatile component such as solvent contained in the coating film is 10 to 100% by mass relative to the total amount 100% by mass of the volatile component contained in the composition before coating.

Namely, in this description, the coating film contains a certain amount of a volatile component such as solvent.

In the case where the laminate (Ln) has plural layers (XA), the plural layers (XA) may be the same as or different from each other.

In the case where the layer (X1) that is the first layer from the support side is a layer (XA), preferably, the pattern layer and the layer (XA) contain a same kind of resin, and for example, in the case where the pattern layer is formed of an acrylic resin, preferably, the pressure-sensitive adhesive layer (XA) is formed of an acrylic resin to be mentioned hereinunder. Such an embodiment is preferred since the interfacial adhesion between the pressure-sensitive adhesive layer (XA) and the pattern layer improves and the requirement (1) can be thereby more readily satisfied.

For example, preferably, the pattern layer is a layer formed of a composition containing one or more selected from the group consisting of an acrylic resin, a urethane-based resin, an acrylic urethane-based resin, and a polyester-based resin, and the layer (XA) is a layer formed of a composition (x) containing one or more pressure-sensitive adhesive resin selected form the group consisting of an acrylic resin, a urethane-based resin, an acrylic urethane-based resin, and a polyester-based resin.

Also preferably, in the layer (X), a layer in contact with the layer (Y) is the layer (XA). In such an embodiment, it is considered that the interfacial adhesion between the layer (X) and the layer (Y) may improve, and there may hardly occur interfacial peeling between the layer (X) and the layer (Y) in the pressure-sensitive adhesive laminate by the tensile stress occurring during a process of peeling of the peel detection label or a process of deformation of the peel detection label, and accordingly, the embodiment can contribute toward improving the effect of preventing occurrence of adhesive residue.

[Composition (x)]

The composition (x) that is a forming material for the pressure-sensitive adhesive layer (XA) is one containing a pressure-sensitive adhesive resin.

In one embodiment of the present invention, the other component than the pressure-sensitive adhesive resin contained in the composition (x) can be appropriately selected according to a use application of the peel detection label of the present invention.

For example, in one embodiment of the present invention, from the viewpoint of adjusting the peel strength to a desired range, the pressure-sensitive adhesive resin-containing composition (x) may further contain at least one selected from the group consisting of a tackifier and a crosslinking agent in addition to the pressure-sensitive adhesive resin therein. Besides, the composition (x) may contain at least one selected from the group consisting of a diluent solvent and an additive for pressure-sensitive adhesive to be used in a general pressure-sensitive adhesive.

(Pressure-Sensitive Adhesive Resin)

A mass average molecular weight (Mw) of the pressure-sensitive adhesive resin is preferably 10,000 to 2,000,000, more preferably 20,000 to 1,500,000, and still more preferably 30,000 to 1,000,000.

Examples of the pressure-sensitive adhesive rein which is contained in the composition (x) include an acrylic resin, a urethane-based resin, a polyisobutylene-based resin, an olefin-based resin, an acrylic urethane-based resin, and a polyester-based resin, each of which satisfies the peel strength of the pressure-sensitive adhesive layer (XA) as mentioned later. Of these, at least one selected from the group consisting of an acrylic resin, a urethane-based resin, an acrylic urethane-based resin, and a polyester-based resin is preferred, and an acrylic resin is more preferred.

These pressure-sensitive adhesive resins may be used alone or may be used in combination of two or more thereof.

In the case where such a pressure-sensitive adhesive resin is a copolymer having two or more structural units, a mode of the copolymer is not particularly limited, and any of a block copolymer, a random copolymer, and a graft copolymer may be used.

In the case where a layer in contact with the layer (Y) is the layer (XA), from the viewpoint of more improving the interfacial adhesion between the layer (XA) and the layer (Y), preferably, the pressure-sensitive adhesive resin is a UV non-curable pressure-sensitive adhesive resin not having a polymerizable functional group.

The content of the pressure-sensitive adhesive resin in the composition (x) to form the layer (XA) is preferably 30 to 99.99% by mass, more preferably 40 to 99.95% by mass, still more preferably 50 to 99.90% by mass, yet still more preferably 55 to 99.80% by mass, and even yet still more preferably 60 to 99.50% by mass in the total amount (100% by mass) of the active components of the composition (x).

{Acrylic Resin}

In one embodiment of the present invention where a layer in contact with the layer (Y) is the layer (XA), from the viewpoint of more improving the interfacial adhesion to the layer (Y), it is preferred that the pressure-sensitive adhesive resin which is contained in the composition (x) contains an acrylic rein.

From the viewpoint of more improving the interfacial adhesion, a content proportion of the acrylic resin in the pressure-sensitive adhesive resin is preferably 30 to 100% by mass, more preferably 50 to 100% by mass, still more preferably 70 to 100% by mass, and yet still more preferably 85 to 100% by mass in the total amount (100% by mass) of the pressure-sensitive adhesive resin which is contained in the composition (x).

Examples of the acrylic resin which can be used as the pressure-sensitive adhesive resin include a polymer containing a structural unit derived from an alkyl (meth)acrylate having a linear or branched alkyl group; and a polymer containing a structural unit derived from a (meth)acrylate having a cyclic structure.

A mass average molecular weight (Mw) of the acrylic resin is preferably 100,000 to 1,500,000, more preferably 200,000 to 1,300,000, still more preferably 350,000 to 1,200,000, and yet still more preferably 500,000 to 1,100,000.

The acrylic resin is preferably an acrylic polymer (A0) having a structural unit (a1) derived from an alkyl (meth) acrylate (a1') (hereinafter also referred to as "monomer (a1')"), and more preferably an acrylic copolymer (A1) having a structural unit (a2) derived from a functional group-containing monomer (a2') (hereinafter also referred to as "monomer (a2')") together with the structural unit 1).

From the viewpoint of an improvement in pressure-sensitive adhesive characteristics, the carbon number of the alkyl group which the monomer (a1') has is preferably 1 to 24, more preferably 1 to 12, still more preferably 1 to 8, and yet still more preferably 4 to 6.

The alkyl group which the monomer (a1') has may be a linear alkyl group or may be a branched alkyl group.

Examples of the monomer (a1') include methyl (meth) acrylate, ethyl (meth)acrylate, propyl (meth)acrylate, butyl (meth)acrylate, 2-ethylhexyl (meth)acrylate, lauryl (meth) acrylate, tridecyl (meth)acrylate, and stearyl (meth)acrylate.

Methyl (meth)acrylate, butyl (meth)acrylate, and 2-ethylhexyl (meth)acrylate are preferred as the monomer (a1'), and methyl (meth)acrylate and butyl (meth)acrylate are more preferred.

These monomers (a1') may be used alone or may be used in combination of two or more thereof.

The content of the structural unit (a1) is preferably 50 to 100% by mass, more preferably 60 to 99.9% by mass, still more preferably 70 to 99.5% by mass, and yet still more preferably 80 to 99.0% by mass in the whole structural units (100% by mass) of the acrylic polymer (A0) or the acrylic copolymer (A1).

The functional group which the monomer (a2') has refers to a functional group capable of reacting with a crosslinking agent as mentioned later, which the composition (x) may contain, and serving as a crosslinking starting point or a functional group having a crosslinking promoting effect, and examples thereof include a hydroxy group, a carboxy group, an amino group, and an epoxy group.

Namely, examples of the monomer (a2') include a hydroxy group-containing monomer, a carboxy group-containing monomer, an amino group-containing monomer, and an epoxy group-containing monomer.

These monomers (a2') may be used alone or may be used in combination of two or more thereof.

A hydroxy group-containing monomer and a carboxy group-containing monomer are preferred as the monomer (a2').

Examples of the hydroxy group-containing monomer include a hydroxyalkyl (meth)acrylate, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate; and an unsaturated alcohol, such as vinyl alcohol and allyl alcohol.

Examples of the carboxy group-containing monomer include an ethylenically unsaturated monocarboxylic acid, such as (meth)acrylic acid and crotonic acid; an ethylenically unsaturated dicarboxylic acid, such as fumaric acid, itaconic acid, maleic acid, and citraconic acid, and an hydride thereof; 2-(acryloyloxy)ethyl succinate, and 2-carboxyethyl (meth)acrylate.

2-Hydroxyethyl (meth)acrylate and (meth)acrylic acid are preferred as the monomer (a2').

These monomers (a2') may be used alone or may be used in combination of two or more thereof.

The content of the structural unit (a2) is preferably 0.1 to 40% by mass, more preferably 0.3 to 30% by mass, still more preferably 0.5 to 20% by mass, and yet still more preferably 0.7 to 10% by mass in the whole structural units (100% by mass) of the acrylic copolymer (A1).

Preferably, the acrylic copolymer (A1) further has a structural unit (a3) derived from other monomer (a3') than the monomers (a1') and (a2').

In the acrylic copolymer (A1), the content of the structural units (a1) and (a2) is preferably 70 to 100% by mass, more preferably 80 to 100% by mass, still more preferably 85 to 100% by mass, and yet still more preferably 90 to 100% by mass in the whole structural units (100% by mass) of the acrylic copolymer (A1).

Examples of the monomer (a3') include an olefin, such as ethylene, propylene, and isobutylene; a halogenated olefin, such as vinyl chloride and vinylidene chloride; a diene-based monomer, such as butadiene, isoprene, and chloroprene; a (meth)acrylate having a cyclic structure, such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, and an imide (meth)acrylate; styrene, α-methylstyrene, vinyltoluene, vinyl formate, vinyl acetate, acrylonitrile, (meth)acrylamide, (meth)acrylonitrile, (meth)acryloyl morpholine, and N-vinylpyrrolidone.

Vinyl acetate is preferred as the monomer (a3').

{Urethane-Based Resin}

The urethane-based resin which can be used as the pressure-sensitive adhesive resin is not particularly limited so long as it is a polymer having at least one of a urethane bond and a urea bond in at least one of a main chain and a side chain.

Specifically, examples of the urethane-based resin include a urethane-based prepolymer (UX) which is obtained through a reaction between a polyol and a polyvalent isocyanate compound.

The urethane-based prepolymer (UX) may be one obtained by further performing a chain extension reaction with a chain extender.

A mass average molecular weight (Mw) of the urethane-based resin is preferably 10,000 to 200,000, more preferably 12,000 to 150,000, still more preferably 15,000 to 100,000, and yet still more preferably 20,000 to 70,000.

Examples of a polyol serving as a raw material of the urethane-based prepolymer (UX) include polyol compounds, such as an alkylene type polyol, a polyether type polyol, a polyester type polyol, a polyester amide type polyol, a polyester/polyether type polyol, and a polycarbonate type polyol. However, the foregoing polyol is not particularly limited so long as it is a polyol, and it may be a bifunctional diol or a trifunctional triol.

These polyols may be used alone or may be used in combination of two or more thereof.

Of these polyols, from the viewpoint of easiness of availability, and reactivity, a diol is preferred, and an alkylene type diol is more preferred.

Examples of the alkylene type diol include an alkane diol such as 1,3-propanediol, 1,4-butanediol, 1,5-pentanediol, neopentyl glycol, and 1,6-hexanediol; an alkylene glycol, such as ethylene glycol, propylene glycol, diethylene glycol, and dipropylene glycol; a polyalkylene glycol, such as polyethylene glycol, polypropylene glycol, and polybutylene glycol; and a polyoxyalkylene glycol, such as polytetramethylene glycol.

Of these alkylene type diols, a glycol having a mass average molecular weight (Mw) of 1,000 to 3,000 is preferred from the viewpoint of suppressing gelation on further performing the reaction with a chain extender.

Examples of the polyvalent isocyanate compound serving as a raw material of the urethane-based prepolymer (UX) include an aromatic polyisocyanate, an aliphatic polyisocyanate, and an alicyclic polyisocyanate.

Examples of the aromatic polyisocyanate include 1,3-phenylene diisocyanate, 1,4-phenylene diisocyanate, 4,4'-diphenylmethane diisocyanate (MDI), 2,4-tolylene diisocyanate (2,4-TDI), 2,6-tolylene diisocyanate (2,6-TDI), 4,4'-toluidine diisocyanate, 2,4,6-triisocyanatotoluene, 1,3,5-triisocyanatobenzene, dianisidine diisocyanate, 4,4'-diphenyl ether diisocyanate, 4,4',4"-triphenylmethane triisocyanate, 1,4-tetramethylxylylene diisocyanate, and 1,3-tetramethylxylylene diisocyanate.

Examples of the aliphatic polyisocyanate include trimethylene diisocyanate, tetramethylene diisocyanate, hexamethylene diisocyanate (HMDI), pentamethylene diisocyanate, 1,2-propylene diisocyanate, 2,3-butylene diisocyanate, 1,3-butylene diisocyanate, dodecamethylene diisocyanate, and 2,4,4-trimethylhexamethylene diisocyanate.

Examples of the alicyclic polyisocyanate include 3-isocyanatomethyl-3,5,5-trimethylcyclohexyl isocyanate (IPDI: isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylene bis(cyclohexyl isocyanate), and 1,4-bis(isocyanatomethyl)cyclohexane.

Such a polyvalent isocyanate compound may be a trimethylolpropane adduct type modified product, a biuret type modified product resulting from a reaction with water, or an isocyanurate type modified product containing an isocyanurate ring, of the aforementioned polyisocyanate.

Of these polyvalent isocyanate compounds, at least one selected from 4,4'-diphenylmethane diisocyanate (MDI), 2,4-tolylene diisocyanate (2,4-TDI), 2,6-tolylene diisocyanate (2,6-TDI), hexamethylene diisocyanate (HMDI), 3-isocyanatomethyl-3,5,5-trimethylcyclohexyl isocyanate (IPDI), and modified products thereof is preferred from the viewpoint of obtaining a urethane-based polymer with excellent pressure-sensitive adhesive physical properties; and at least one selected from HMDI, IPDI, and modified products thereof is more preferred from the viewpoint of weather resistance.

The isocyanate group content (NCO %) in the urethane-based prepolymer (UX) is preferably 0.5 to 12% by mass, and more preferably 1 to 4% by mass in terms of a value as measured in conformity with JIS K1603-1:2007.

As the chain extender, a compound having two of at least one of a hydroxy group and an amino group, or a compound having three or more of at least one of a hydroxy group and an amino group is preferred.

As the compound having two of at least one of a hydroxy group and an amino group, at least one compound selected from the group consisting of an aliphatic diol, an aliphatic diamine, an alkanolamine, a bisphenol, and an aromatic diamine is preferred.

Examples of the aliphatic diol include an alkane diol, such as 1,3-propanediol, 1,4-butanediol, 1,5-pentanediol, neopentyl glycol, 1,6-hexanediol, and 1,7-heptanediol; and an alkylene glycol, such as ethylene glycol, propylene glycol, diethylene glycol, and dipropylene glycol.

Examples of the aliphatic diamine include ethylenediamine, 1,3-propanediamine, 1,4-butanediamine, 1,5-pentanediamine, and 1,6-hexanediamine Examples of the alkanolamine include monoethanolamine, monopropanolamine, and isopropanolamine.

Examples of the bisphenol include bisphenol A.

Examples of the aromatic diamine include diphenymethanediamine, tolylenediamine, and xylylene diamine.

Examples of the compound having three or more of at least one of a hydroxy group and an amino group include a polyol, such as trimethylolpropane, ditrimethylolpropane, pentaerythritol, and dipentaerythritol; an amino alcohol, such as 1-amino-2,3-propanediol, 1-methylamino-2,3-propanediol, and N-(2-hydroxypropylethanolamine); and an ethylene oxide or propylene oxide adduct of tetramethylxylylenediamine.

{Polyisobutylene-Based Resin}

The polyisobutylene-based resin (hereinafter also referred to as "PIB-based resin") which can be used as the pressure-sensitive adhesive resin is not particularly limited so long as it is a resin having a polyisobutylene structure in at least one of a main chain and a side chain.

A mass average molecular weight (Mw) of the PIB-based resin is preferably 20,000 or more, more preferably 30,000 to 1,000,000, still more preferably 50,000 to 800,000, and yet still more preferably 70,000 to 600,000.

Examples of the PIB-based resin include polyisobutylene that is a homopolymer of isobutylene, a copolymer of isobutylene and isoprene, a copolymer of isobutylene and n-butene, a copolymer of isobutylene and butadiene, and a halogenated butyl rubber resulting from bromination or chlorination of such a copolymer.

In the case where the PIB-based resin is a copolymer, it should be construed that the structural unit composed of isobutylene is contained in the largest proportion in the whole structural units.

The content of the structural unit composed of isobutylene is preferably 80 to 100% by mass, more preferably 90 to 100% by mass, and still more preferably 95 to 100% by mass in the whole structural units (100% by mass) of the PIS-based resin.

These PIB-based resins may be used alone or may be used in combination of two or more thereof.

In the case of using the PIB-based resin, it is preferred to use a combination of a PIB-based resin having a high mass average molecular weight (Mw) and a PIB-based resin having a low mass average molecular weight (Mw).

More specifically, it is preferred to use a combination of a PIB-based resin (pb1) having a mass average molecular weight (Mw) of 270,000 to 600,000 (hereinafter also referred to as "PIB-based resin (pb1)") and a PIB-based resin (pb2) having a mass average molecular weight (Mw) of 50,000 to 250,000 (hereinafter also referred to as "PIB-based resin (pb2)").

By using the PIB-based resin (pb1) having a high mass average molecular weight (Mw), not only the durability and the weather resistance of the pressure-sensitive adhesive layer formed can be improved, but also the peel strength can be improved.

By using the PIB-based resin (pb2) having a low mass average molecular weight (Mw), the PIB-based resin (pb2) is favorably compatibilized with the PIB-based resin (pb1), thereby enabling it to appropriately plasticize the PIB-based resin (pb1), and wettability of the pressure-sensitive adhesive layer with the adherend is enhanced, whereby pressure-sensitive adhesive physical properties, flexibility, can be improved.

The mass average molecular weight (Mw) of the PIB-based resin (pb1) is preferably 270,000 to 600,000, more preferably 290,000 to 480,000, still more preferably 310,000 to 450,000, and yet still more preferably 320,000 to 400,000.

The mass average molecular weight (Mw) of the PIB-based resin (pb2) is preferably 50,000 to 250,000, more preferably 80,000 to 230,000, still more preferably 140,000 to 220,000, and yet still more preferably 180,000 to 210,000.

A content proportion of the PIB-based resin (pb2) is preferably 5 to 55 parts by mass, more preferably 6 to 40 parts by mass, still more preferably 7 to 30 parts by mass, and yet still more preferably 8 to 20 parts by mass based on 100 parts by mass of the PIB-based resin (pb1).

{Olefin-Based Resin}

The olefin-based resin which can be used as the pressure-sensitive adhesive resin is not particularly limited so long as it is a polymer having a structural unit derived from an olefin compound, such as ethylene and propylene.

The olefin-based resin may be used alone or may be used in combination of two or more thereof.

Specifically, examples of the olefin-based resin include a polyethylene, such as low density polyethylene, medium density polyethylene, high density polyethylene, and linear low density polyethylene, polypropylene, a copolymer of ethylene and propylene, a copolymer of ethylene and other α-olefin, a copolymer of propylene and other α-olefin, a copolymer of ethylene, propylene, and other α-olefin, and a copolymer of ethylene and other ethylenically unsaturated monomer (e.g., an ethylene-vinyl acetate copolymer and an ethylene-alkyl (meth)acrylate copolymer).

Examples of the other α-olefin include 1-butene, 1-pentene, 1-hexene, 1-heptene, 1-octene, 4-methyl-1-pentene, and 4-methyl-1-hexene.

Examples of the ethylenically unsaturated monomer include vinyl acetate, an alkyl (meth)acrylate, and vinyl alcohol.

{Acrylic Urethane-Based Resin}

Examples of the acrylic urethane-based resin which can be used as the pressure-sensitive adhesive resin include those in which the kind and amount of a monomer component and a crosslinking agent are appropriately controlled so as to have pressure-sensitive adhesiveness in an acrylic urethane-based resin as mentioned later, and it is not particularly limited so long as it has pressure-sensitive adhesiveness.

{Polyester-Based Resin}

The polyester-based resin which can be used as the pressure-sensitive adhesive resin is not particularly limited so long as it has pressure-sensitive adhesiveness. Examples of the main component of the polyester-based resin (the resin component having the largest content (use amount) in the polyester-based resin) include random copolymers of an aromatic acid component, such as terephthalic acid, isophthalic acid, methylterephthalic acid, and naphthalenedicarboxylic acid, and a glycol component, such as ethylene glycol, diethylene glycol, butylene glycol, and neopentyl glycol. The polyester-based pressure-sensitive adhesive using the polyester-based resin is constituted of a polyester, a solvent, a crosslinking agent, and a tackifier, and as the crosslinking system, methylol group condensation, ionic crosslinking, isocyanate crosslinking, and epoxy crosslinking are utilized.

(Tackifier)

In one embodiment of the present invention, in the case of providing the pressure-sensitive adhesive layer (XA) with a more improved peel strength, it is preferred that the pressure-sensitive adhesive resin-containing composition (x) further contains a tackifier. As described below, the peel strength of the pressure-sensitive adhesive layer (XA) is preferably larger than the peel strength of the pressure-sensitive adhesive layer (Z) to be mentioned below, and therefore, in the case of this configuration, the composition (x) to form the pressure-sensitive adhesive layer (XA) preferably further contains a tackifier, and more preferably, the composition (x) to form the pressure-sensitive adhesive layer (XA) further contains a tackifier and the composition (z) to form the pressure-sensitive adhesive layer (Z) does not contain a tackifier.

Here, the "tackifier" is a component auxiliarily improving the peel strength of the pressure-sensitive adhesive resin and refers to an oligomer having a mass average molecular weight (Mw) of less than 10,000 and being distinguished from the aforementioned pressure-sensitive adhesive resin.

The mass average molecular weight (Mw) of the tackifier is preferably 400 to 10,000, more preferably 500 to 8,000, and still more preferably 800 to 5,000.

Examples of the tackifier include a rosin-based resin, such as a rosin resin, a rosin ester resin, and a rosin-modified phenol resin; a hydrogenated rosin-based resin resulting from hydrogenation of the foregoing rosin-based resin; a terpene-based resin, such as a terpene resin, an aromatic modified terpene resin, and a terpene phenol-based resin; a hydrogenated terpene-based resin resulting from hydrogenation of the foregoing terpene-based resin; a styrene-based resin resulting from copolymerization of a styrene-based monomer, such as α-methylstyrene and ß-methylstyrene, and an aliphatic monomer; a hydrogenated styrene-based resin resulting from hydrogenation of the foregoing styrene-based resin; a C5-based petroleum resin resulting from copolymerization of a C5 fraction produced by thermal cracking of petroleum naphtha, such as pentene, isoprene, piperine, and 1,3-pentadiene, and a hydrogenated petroleum resin of the foregoing C5-based petroleum resin; and a C9-based petroleum resin resulting from copolymerization of a C9 fraction produced by thermal cracking of petroleum naphtha, such as indene and vinyltoluene, and a hydrogenated petroleum resin of the foregoing C9-based petroleum resin.

These tackifiers may be used alone or may be used in combination of two or more thereof having a different softening point or structure from each other.

A softening point of the tackifier is preferably 60 to 170° C., more preferably 65 to 160° C., and still more preferably 70 to 150° C.

In this description, the "softening point" of the tackifier means a value as measured in conformity with JIS K2531.

In the case of using two or more of plural tackifiers, it is preferred that a weighted average of the softening points of those plural tackifiers falls within the aforementioned range.

In the case where the composition (x) contains the tackifier, the content of the tackifier in the composition (x) is preferably 0.01 to 65% by mass, more preferably 0.05 to 55% by mass, still more preferably 0.1 to 50% by mass, yet still more preferably 0.5 to 45% by mass, and even yet still more preferably 1.0 to 40% by mass in the total amount (100% by mass) of the active components of the composition (x).

The total content of the pressure-sensitive adhesive resin and the tackifier in the composition (x) is preferably 70% by mass or more, more preferably 80% by mass or more, still more preferably 85% by mass or more, yet still more preferably 90% by mass or more, and even yet still more preferably 95% by mass or more in the total amount (100% by mass) of the active components of the composition (x).

(Crosslinking Agent)

In one embodiment of the present invention, it is preferred that the composition (x) further contains a crosslinking agent together with the aforementioned pressure-sensitive adhesive resin having a functional group, such as the acrylic copolymer having the structural units (a1) and (a2).

The crosslinking agent is one which reacts with the functional group which the pressure-sensitive adhesive resin has, to crosslink the resins to each other.

Examples of the crosslinking agent include an isocyanate-based crosslinking agent, such as tolylene diisocyanate, xylylene diisocyanate, and a hexamethylene diisocyanate, and an adduct thereof, an epoxy-based crosslinking agent, such as ethylene glycol glycidyl ether; an aziridine-based crosslinking agent, such as hexa[1-(2-methyl)-aziridinyl] triphosphatriazine; and a chelate-based crosslinking agent, such as an aluminum chelate.

These crosslinking agents may be used alone or may be used in combination of two or more thereof. Of these crosslinking agents, an isocyanate-based crosslinking agent is preferred from the viewpoint of increasing cohesion to improve the peel strength and the viewpoint of easiness of availability, etc.

Although the content of the crosslinking agent is appropriately controlled by the number of functional groups which the pressure-sensitive adhesive resin has, for example, it is preferably 0.01 to 10 parts by mass, more preferably 0.03 to 7 parts by mass, and still more preferably 0.05 to 4 parts by mass based on 100 parts by mass of the aforementioned pressure-sensitive adhesive resin having a functional group, such as the aforementioned acrylic copolymer.

(Additive for Pressure-Sensitive Adhesive)

In one embodiment of the present invention, the composition (x) may contain an additive for pressure-sensitive adhesive which is generally used for pressure-sensitive adhesives, other than the aforementioned tackifier and crosslinking agent, within a range where the effects of the present invention are not impaired.

Examples of the additive for pressure-sensitive adhesive include an antioxidant, a softener (plasticizer), a rust inhibitor, a retarder, a catalyst, and a UV absorber.

These additives for pressure-sensitive adhesive may be used alone or may be used in combination of two or more thereof.

In the case of containing these additives for pressure-sensitive adhesive, the contents of the respective additives for pressure-sensitive adhesive are each independently preferably 0.0001 to 20 parts by mass, and more preferably 0.001 to 10 parts by mass based on 100 parts by mass of the pressure-sensitive adhesive resin.

(Diluent Solvent)

In one embodiment of the present invention, the composition (x) may contain, as a diluent solvent, water or an organic solvent together with the aforementioned various active components, to form to a solution.

Examples of the organic solvent include toluene, xylene, ethyl acetate, butyl acetate, methyl ethyl ketone, diethyl ketone, methyl isobutyl ketone, methanol, ethanol, isopropyl alcohol, tert-butanol, s-butanol, acetylacetone, cyclohexanone, n-hexane, and cyclohexane.

These diluent solvents may be used alone or may be used in combination of two or more thereof.

In the case where the composition (x) contains the diluent solvent to form a solution, the concentration of the active components of the composition (x) is preferably 1 to 65% by mass, more preferably 5 to 60% by mass, still more preferably 10 to 50% by mass, and yet still more preferably 25 to 45% by mass.

The peel strength of the pressure-sensitive adhesive layer (XA) is preferably 1.0 N/25 mm or more, more preferably 5.0 N/25 mm or more, still more preferably 10.0 N/25 mm or more, and yet still more preferably 14.0 N/25 mm or more. Although an upper limit value of the peel strength of the pressure-sensitive adhesive layer (XA) is not particularly limited, it is preferably 40.0 N/25 mm or less, more preferably 35.0 N/25 mm or less, still more preferably 30.0 N/25 mm or less, and yet still more preferably 25.0 N/25 mm or less.

In the case where the layer (XA) is in contact with the layer (Y), the peel strength of the layer (XA) is preferably 1.0 N/25 mm or more, more preferably 5.0 N/25 mm or more, still more preferably 10.0 N/25 mm or more, yet still more preferably 14.0 N/25 mm or more, and even yet still more preferably 18.0 N/25 mm or more.

In the case where the peel strength of the layer (XA) satisfies the foregoing range, at the time of peeling of the peel detection label, peeling at the interface between the support and/or the pattern layer and the pressure-sensitive adhesive layer (XA) hardly occurs, the pressure-sensitive adhesive layer (XA) itself is hardly broken, and it may be considered that occurrence of adhesive residue onto the adherend can be effectively prevented, and hence, such is preferred.

Although an upper limit value of the peel strength of the pressure-sensitive adhesive layer (XA) is not particularly limited, it is preferably 40.0 N/25 mm or less, more preferably 35.0 N/25 mm or less, still more preferably 30.0 N/25 mm or less, and yet still more preferably 25.0 N/25 mm or less.

Specifically, the peel strength can be measured according to the method described in the section of Examples.

The peel strength of the layer (XA) can be controlled, for example, by controlling the choice of the kind of each component such as the pressure-sensitive adhesive resin to form the layer (XA), the tackifier, the crosslinking agent, and other additives for pressure-sensitive adhesive, and by controlling the content of each component.

In the case where the layer (X) is a laminate (Ln), the shear storage elastic modulus G' at 23° C. of the layer (XA) is not limited so far as the thickness-average elastic modulus of the laminate (Ln) satisfies the aforementioned range, and in one preferred embodiment of the peel detection label, the shear storage elastic modulus is preferably $1.5 \times 10^4$ Pa or more, more preferably $3.0 \times 10^4$ Pa or more, even more preferably $6.0 \times 10^4$ Pa or more, and is preferably $2.0 \times 10^5$ Pa or less, more preferably $1.0 \times 10^5$ Pa or less, even more preferably $9.0 \times 10^4$ Pa or less, further more preferably $8.0 \times 10^4$ Pa or less, further more preferably $7.0 \times 10^4$ Pa or less.

Specifically, the shear storage elastic modulus G' at 23° C. of the layer (XA) can be measured according to the method described in the section of Examples.

Examples of the other layer (XQ) than the pressure-sensitive adhesive layer (XA) that the layer (X) may have include a layer formed of one or more resins selected from the group consisting of acrylic resins such as poly(meth) acrylate, and polymethyl (meth)acrylate; urethane-based resins, acrylic urethane-based resins; and polyamide resins except the aforementioned pressure-sensitive adhesive resins, and among these, a layer formed of an energy ray-curable resin is referred to. Examples of the energy ray-curable resin includes one or more selected from an energy ray-curable urethane-based resin and an energy ray-curable acrylic urethane-based resin.

In the case where the layer (X) is a laminate (Ln), the shear storage elastic modulus G' at 23° C. of the layer (XQ) is not limited so far as the thickness-average elastic modulus of the laminate (Ln) satisfies the aforementioned range, and in one preferred embodiment of the peel detection label, the shear storage elastic modulus is preferably $9.0 \times 10^4$ Pa or more, more preferably $1.0 \times 10^5$ Pa or more, even more preferably $2.0 \times 10^5$ Pa or more, further more preferably $3.0 \times 10^5$ Pa or more, further more preferably $4.0 \times 10^5$ Pa or more, and is preferably $15.0 \times 10^5$ Pa or less, more preferably $10.0 \times 10^5$ Pa or less, even more preferably $9.0 \times 10^5$ Pa or less, further more preferably $8.0 \times 10^5$ Pa or less, further more preferably $7.0 \times 10^5$ Pa or less, Specifically, the shear storage elastic modulus G' at 23° C. of the layer (XQ) can be measured according to the method described in the section of Examples.

<<High Modulus Layer (Y)>>

Regarding the high modulus layer (Y) for use in the peel detection label of the present invention, the term "high elasticity" means that the elastic modulus of a layer is relatively higher than that of the aforementioned low modulus layer (X). Specifically, the terms "high modulus layer" and "low modulus layer" referred to in this description are terms correlating to each other.

From the viewpoint of satisfying both prevention of adhesive residue on an adherend and excellent pattern expressibility in the peel detection label, preferably, the layer (Y) is a layer whose tensile storage elastic modulus E' at 23° C. (hereinafter also referred to as "elastic modulus E'") is 10 MPa or more and 800 MPa or less.

From the viewpoint of making both prevention of adhesive residue onto an adherend and excellent pattern expressibility compatible with each other, the elastic modulus E' of the layer (Y) is preferably 15 MPa or more, more preferably 18 MPa or more, still more preferably 50 MPa or more, yet still more preferably 100 MPa or more, and even yet still more preferably 200 MPa or more, and it is preferably 700 MPa or less, more preferably 600 MPa or less, still more preferably 500 MPa or less, yet still more preferably 400 MPa or less, and even yet still more preferably 300 MPa or less.

From the viewpoint of obtaining more excellent pattern expressibility, the layer (Y) is preferably a layer having a lower elastic modulus E' than the elastic modulus E' of the support.

As for the value of the elastic modulus of E' the layer (Y), in the case where the foregoing value is more than 100 MPa, it means a value of a tensile storage elastic modulus E' at 23° C. as measured by a tensile method, and in the case where the foregoing value is 100 MPa or less, it means a value of a tensile storage elastic modulus E' at 23° C. as converted from the shear storage elastic modulus G' at 23° C. measured according to a torsional shear method. Specifically, the values can be measured by the method described in the section of Examples.

The elastic modulus E' of the layer (Y) can be controlled, for example, by controlling the choice of the kind of each component such as the resin to form the layer (Y) to be mentioned hereinunder, the crosslinking agent, the catalyst and other additives, and by controlling the content of each component.

The layer (Y) is preferably a layer satisfying the aforementioned elastic modulus E', and for example, among the plastic films described in the aforementioned section of support, one satisfying the aforementioned elastic modulus E' can also be used for the layer (Y). In the case of using the foregoing plastic film, from the viewpoint of transparency, costs, and versatility, a film formed of an acrylic urethane-based resin, an olefin-based resin, a polyamide, or a polyester-based resin is preferred. In addition, the layer (Y) may also be a layer formed by drying a coating film composed of the composition containing a non-pressure-sensitive adhesive resin.

The layer (Y) is more preferably a layer formed of a composition (y) containing at least one non-pressure-sensitive adhesive resin (y1) selected from the group consisting of an acrylic urethane-based resin and an olefin-based resin, and still more preferably a layer formed by drying a coating film (y') composed of a composition (y) containing at least one non-pressure-sensitive adhesive resin (y1) selected from the group consisting of an acrylic urethane-based resin and an olefin-based resin.

In the case where the layer (Y) is a layer formed by drying the coating film (y') composed of the composition (y), it becomes a non-stretched film-like material or sheet-like material, and therefore, the foregoing layer (Y) is remarkably excellent in flexibility as compared with the layer (Y) constituted of a plastic film or sheet obtained by a method, for example, melt extrusion molding.

Accordingly, in the case where the layer (Y) is a layer formed by drying the coating film (y') composed of the composition (y), on peeling the peel detection label, the layer (Y) more easily causes deformation necessary for expressing the pattern layer, and even in the case where a tensile stress generated within the peel detection label is larger, the pressure-sensitive adhesive laminate is hardly broken. Therefore, it may be considered that it becomes easy to make both more excellent pattern expressibility and adhesive residue-preventing properties compatible with each other.

In this description, the wording "non-stretched film-like material or sheet-like material" excludes a film-like material or sheet-like material obtained by intentionally stretching in a specified direction. Examples of a case to be excluded include a case of intentionally controlling a rotation speed ratio between the respective rolls for the purpose of stretching the film-like material or sheet-like material, namely a case of using a "Roll-to-Roll manufacturing apparatus" as a stretching machine.

Meanwhile, a case where a film-like material or sheet-like material is stretched clue to a stress that is inevitably applicable in a flow direction for the purpose of merely holding the material in a continuous production process with, for example, a Roll-to-Roll manufacturing apparatus is not applied, and the foregoing material can be considered to be "a non-stretched film-like material or sheet-like material".

[Composition (y)]

It is preferred that the composition (y) that is a forming material of the layer (Y) is a composition containing at least one non-pressure-sensitive adhesive resin (y1) selected from the group consisting of an acrylic urethane-based resin and an olefin-based resin.

In one embodiment of the present invention, other component than the non-pressure-sensitive adhesive resin (y1) to be contained in the composition (y) can be appropriately controlled according to the use application of the peel detection label of the present invention.

For example, in one embodiment of the present invention, the composition (y) may contain other resin than the acrylic urethane-based resin and the olefin-based resin and may contain at least one selected from a diluent solvent and other additives within a range where the effects of the present invention are not impaired.

(Non-Pressure-Sensitive Adhesive Resin (y1))

It is preferred that the non-pressure-sensitive adhesive resin (y1) is a resin belonging to an acrylic urethane-based resin or an olefin-based resin.

In the case where the non-pressure-sensitive adhesive resin (y1) is a copolymer having two or more structural units, the mode of the copolymer is not particularly limited, but it may be any of a block copolymer, a random copolymer, and a graft copolymer.

Furthermore, in one embodiment of the present invention, from the viewpoint of more improving the interfacial adhesion between the layer (Y) and the layer (X), and/or the interfacial adhesion between the layer (Y) and the layer (Z), it is preferred that the non-pressure-sensitive adhesive resin (y1) to be contained in the composition (y) is a ultraviolet non-curable pressure-sensitive adhesive resin not having a polymerizable functional group.

The content of the non-pressure-sensitive adhesive resin (y1) in the composition (y) is preferably 50 to 100% by mass, more preferably 65 to 100% by mass, still more preferably 80 to 98% by mass, and yet still more 90 to 96% by mass in the total amount (100% by mass) of the active components of the composition (y).

{Acrylic Urethane-based Resin}

Examples of the acrylic urethane-based resin include a reaction product between an acrylic polyol compound and an isocyanate compound and a copolymer resulting from polymerization of a linear urethane prepolymer (UY) having an ethylenically unsaturated group on both ends thereof and a vinyl compound (VY) containing a (meth)acrylic acid ester.

The acrylic urethane-based resin (hereinafter also referred to as "acrylic urethane-based resin (I)") that is the reaction product between an acrylic polyol compound and an isocyanate compound has a chemical structure in which a main chain of the acrylic resin serves as a skeleton, and the molecules thereof are crosslinked with a urethane bond and cured.

Since the acrylic resin serving as the main chain is rich in rigidity, the pressure-sensitive adhesive laminate is hardly broken against the tensile stress generated in a process in which the peel detection label is deformed at the time of peeling of the peel detection label. Therefore, it may be considered that the acrylic urethane-based resin (I) contributes to an improvement of the effect for suppressing occurrence of adhesive residue. Furthermore, since the acrylic urethane-based resin (I) is also excellent in adhesion to the pressure-sensitive adhesive resin contained in the layer (X) and/or the layer (Z), it may be considered that the acrylic urethane-based resin (I) can also contribute to an improvement of the interfacial adhesion to the layer (X) and/or the layer (Z), and it may be considered that owing to the foregoing effect, the interfacial peeling between the layer (X) and the layer (Y), and/or the interfacial peeling between the layer (Z) and the layer (Y) is suppressed in the pressure-sensitive adhesive laminate, and the occurrence of adhesive residues can be more effectively suppressed.

From the same viewpoint, as described in the preferred embodiment of the aforementioned layer (X), the layer in contact with the layer (Y) in the layer (X) is preferably a layer (XA).

Meanwhile, the acrylic urethane-based resin (hereinafter also referred to as "acrylic urethane-based resin (II)") that is a copolymer resulting from polymerization of the linear urethane prepolymer (UY) having an ethylenically unsaturated group on both ends thereof and the vinyl compound (VY) containing a (meth)acrylic acid ester is one in which a main chain of the linear urethane prepolymer (UY) serves as a skeleton and has a structural unit derived from the vinyl compound (VY) containing a (meth)acrylic acid ester on the both ends of the linear urethane prepolymer (UY).

As for the acrylic urethane-based resin (II), since a site originated from the linear urethane prepolymer (UY) is made to intervene between the acrylic sites in the main chain skeleton, a distance between the crosslinking points becomes longer than that of the acrylic urethane-based resin (I), and a molecular structure thereof readily becomes a two-dimensional structure (network structure).

The urethane prepolymer (UY) serving as the main chain is linear, and therefore, when an external force is applied, a stretching effect is high. Accordingly, at the time of peeling of the peel detection label, the pressure-sensitive adhesive laminate is readily deformed following the process in which the peel detection label is deformed and is hardly broken, so that it may be considered that the acrylic urethane-based resin (II) can contribute to an improvement of the effect for suppressing the occurrence of adhesive residue.

Furthermore, the side chain of the structural unit derived from the vinyl compound (VY) containing a (meth)acrylic acid ester has a structure in which it is readily entangled with the pressure-sensitive adhesive resin in the layer (X) and/or the layer (Z).

Accordingly, by using the acrylic urethane-based resin (II) as a forming material of the layer (Y), it may be considered that the acrylic urethane-based resin (II) can contribute to an improvement of the interfacial adhesion to the layer (X) and/or the layer (Z). It may be considered that owing to the foregoing effect, the interfacial peeling between the layer (X) and the layer (Y) and/or the interfacial peeling between the layer (Z) and the layer (Y) can be suppressed in the pressure-sensitive adhesive laminate, and the occurrence of adhesive residues can be more effectively suppressed.

A mass average molecular weight (Mw) of the acrylic urethane-based resin is preferably 2,000 to 500,000, more preferably 4,000 to 300,000, still more preferably 5,000 to 200,000, and yet still more preferably 10,000 to 150,000.

In one embodiment of the present invention, the acrylic urethane-based resin to be contained as the non-pressure-sensitive adhesive resin (y1) in the composition (y) is preferably the acrylic urethane-based resin (II).

The acrylic urethane-based resins (I) and (II) are hereunder described.

{{Acrylic Urethane-Based Resin (I)}}

As the acrylic polyol compound serving as a raw material of the acrylic urethane-based resin (I), an acrylic copolymer (B1) having a structural unit (b1) derived from an alkyl (meth)acrylate (b1') (hereinafter also referred to as "monomer (b1')") and a structural unit (b2) derived from a hydroxy group-containing monomer (b2') (hereinafter also referred to as "monomer (b2')") is preferred.

The carbon number of the alkyl group which the monomer (b1') has is preferably 1 to 12, more preferably 4 to 8, and still more preferably 4 to 6.

The alkyl group which the monomer (b1') has may be either a linear alkyl group or a branched alkyl group.

Examples of the specific monomer (b1') include the same materials as those in the aforementioned monomer (a1').

The monomer (b1') may be used alone or may be used in combination of two or more thereof.

However, as the monomer (b1'), butyl (meth)acrylate and 2-ethylhexyl (meth)acrylate are preferred, and butyl (meth)acrylate is more preferred.

The content of the structural unit (b1) is preferably 60 to 99.9% by mass, more preferably 70 to 99.7% by mass, and still more preferably 80 to 99.5% by mass relative to the whole structural units (100% by mass) of the acrylic copolymer (B1).

Examples of the monomer (b2') include the same materials as the hydroxy group-containing monomer which can be selected for the aforementioned monomer (a2').

The monomer (b2') may be used alone or may be used in combination of two or more thereof.

The content of the structural unit (b2) is preferably 0.1 to 40% by mass, more preferably 0.3 to 30% by mass, and still more preferably 0.5 to 20% by mass relative to the whole structural units (100% by mass) of the acrylic copolymer (B1).

The acrylic copolymer (B1) may further have a structural unit (b3) derived from other monomer (b3') than the monomers (b1') and (b2').

Examples of the monomer (b3') include functional group-containing monomers other than the hydroxy group-containing monomer which can be selected for the aforementioned monomer (a2') and the same materials as those in the aforementioned monomer (a3').

In the acrylic copolymer (B1), the content of the structural units (b1) and (b2) is preferably 70 to 100% by mass, more preferably 80 to 100% by mass, still more preferably 90 to 100% by mass, and yet still more preferably 95 to 100% by mass in the whole structural units (100% by mass) of the acrylic copolymer (B1).

Meanwhile, examples of the isocyanate-based compound serving as the raw material of the acrylic urethane-based resin (I) include the same materials as in the polyvalent isocyanate compound serving as the raw material of the aforementioned urethane-based prepolymer (UX).

However, from the viewpoint of stretchability when an external force is applied, the isocyanate-based compound is preferably an isocyanate-based compound not having an aromatic ring, and an aliphatic polyisocyanate and an alicyclic polyisocyanate are more preferred.

In the acrylic urethane-based resin (I), a ratio of the structural unit derived from the acrylic polyol compound to the structural unit derived from the isocyanate-based compound [(acrylic polyol compound)/(isocyanate-based compound)] is preferably 10/90 to 90/10, more preferably 20/80 to 80/20, still more preferably 30/70 to 70/30, and yet still more preferably 40/60 to 60/40 in terms of a mass ratio.

{Acrylic Urethane-Based Resin (M)}

Examples of the linear urethane prepolymer (UY) serving as the raw material of the acrylic urethane-based resin (II) include a reaction product between a diol and a diisocyanate compound.

The diol and the diisocyanate compound may be used alone or may be used in combination of two or more thereof.

A mass average molecular weight (Mw) of the linear urethane prepolymer (UY) is preferably 1,000 to 300,000, more preferably 3,000 to 200,000, still more preferably 5,000 to 100,000, yet still more preferably 10,000 to 80,000, and even yet still more preferably 20,000 to 60,000.

Examples of the diol constituting the linear urethane prepolymer (UY) include an alkylene glycol, a polyether type diol, a polyester type diol, a polyester amide type ilia a polyester/polyether type diol, and a polycarbonate type diol.

Of these polyols, a polycarbonate type diol is preferred.

Examples of the diisocyanate compound constituting the linear urethane prepolymer (UY) include an aromatic diisocyanate, an aliphatic diisocyanate, and an alicyclic diisocyanate, and from the viewpoint of stretchability when an external force is applied, an alicyclic diisocyanate is preferred.

As the specific diisocyanate compound, among the compounds exemplified above as the polyvalent isocyanate serving as the raw material of the urethane-based prepolymer (UX), those corresponding to the diisocyanate compound are exemplified.

The linear urethane prepolymer (UY) may also be one obtained through a chain extension reaction using a chain extender together with the diol and the diisocyanate compound.

Examples of the chain extender include the same materials as those exemplified above for the chain extender which can be used at the time of synthesis of the urethane-based prepolymer (UX).

In one embodiment of the present invention, the linear urethane prepolymer (UY) is one having an ethylenically unsaturated group on both ends thereof.

As a method for introducing an ethylenically unsaturated group on both ends of the linear urethane prepolymer (UY), there is exemplified a method for allowing terminal NCO groups of a urethane prepolymer resulting through a reaction between a diol and a diisocyanate compound to react with a hydroxyalkyl (meth)acrylate.

Examples of the hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

The vinyl compound (VY) serving as the raw material of the acrylic urethane-based resin (II) contains at least a (meth)acrylic acid ester.

As the (meth)acrylic acid ester, among the aforementioned monomers (a1') to (a3') which are used as the raw material of the acrylic copolymer (A1), the same materials corresponding to the (meth)acrylic acid ester are exemplified.

However, as the (meth)acrylic acid ester, at least one selected from an alkyl (meth)acrylate and a hydroxyalkyl (meth)acrylate is preferred, and a combination of an alkyl (meth)acrylate and a hydroxyalkyl (meth)acrylate is more preferred.

In the case of using a combination of an alkyl (meth)acrylate and a hydroxyalkyl (meth)acrylate, a blending proportion of the hydroxyalkyl (meth)acrylate is preferably 0.1 to 100 parts by mass, more preferably 0.2 to 90 parts by mass, still more preferably 0.5 to 30 parts by mass, yet still more preferably 1.0 to 20 parts by mass, and even yet still more preferably 1.5 to 10 parts by mass based on 100 parts by mass of the alkyl (meth)acrylate.

The carbon number of the alkyl group which the alkyl (meth)acrylate has is preferably 1 to 24, more preferably 1 to 12, still more preferably 1 to 8, and yet still more preferably 1 to 3.

Examples of the alkyl (meth)acrylate include the same materials as those exemplified above for the monomer (a1') serving as the raw material of the acrylic copolymer (A1).

Examples of the hydroxyalkyl (meth)acrylate include the same materials as those exemplified above for the hydroxyalkyl (meth)acrylate which is used for introducing an ethylenically unsaturated group into the both ends of the linear urethane prepolymer (UY).

Examples of the vinyl compound other than the (meth)acrylic acid ester include an aromatic hydrocarbon-based vinyl compound, such as styrene, a-methylstyrene, and vinyltoluene; a vinyl ether, such as methyl vinyl ether and ethyl vinyl ether; and a polar group-containing monomer, such as vinyl acetate, vinyl propionate, (meth)acrylonitrile, N-vinylpyrrolidone, (meth)acrylic acid, maleic acid, fumaric acid, itaconic acid, and meth(acrylamide).

These may be used alone or may be used in combination of two or more thereof.

In one embodiment of the present invention, the content of the (meth)acrylic acid ester in the vinyl compound (VY)

which is used as the raw material of the acrylic urethane-based resin (II) is preferably 40 to 100% by mass, more preferably 65 to 100% by mass, still more preferably 80 to 100% by mass, and yet still more preferably 90 to 100% by mass in the total amount (100% by mass) of the vinyl compound (VY).

In one embodiment of the present invention, the total content of the alkyl (meth)acrylate and the hydroxyalkyl (meth)acrylate in the vinyl compound (VY) which is used as the raw material of the acrylic urethane-based resin (II) is preferably 40 to 100% by mass, more preferably 65 to 100% by mass, still more preferably 80 to 100% by mass, and yet still more preferably 90 to 100% by mass in the total amount (100% by mass) of the vinyl compound (VY).

The acrylic urethane-based resin (II) can be obtained through polymerization of the linear urethane prepolymer (UY) and the vinyl compound (VY) each serving as the raw material.

As for the specific polymerization method, the acrylic urethane-based resin (II) can be synthesized by blending a radical generator in an organic solvent together with the linear urethane prepolymer (UY) and the vinyl compound (UY) each serving as the raw material, to undergo a radical polymerization reaction of the vinyl-based compound (VY) while allowing the ethylenically unsaturated group which the linear urethane prepolymer (UY) has on both ends thereof to serve as the starting point.

Examples of the radical generator to be used include a diazo compound, such as azobisisobutyronitrile, and benzoyl peroxide.

In this radical polymerization reaction, a degree of acrylic polymerization may be controlled by adding a chain transfer agent, such as a thiol group-containing compound, in a solvent.

In the acrylic urethane-based resin (II) which is used in one embodiment of the present invention, a content ratio of the structural unit derived from the linear urethane prepolymer (UY) to the structural unit derived from the vinyl compound (VY) [(UY)/(VY)] is preferably 10/90 to 80/20, more preferably 20/80 to 70/30, still more preferably 30/70 to 60/40, and yet still more preferably 35/65 to 55/45 in terms of a mass ratio.

{Olefin-Based Resin}

The olefin-based resin which is contained as the non-pressure-sensitive adhesive resin (y1) in the composition (y) is a polymer having at least a structural unit derived from an olefin monomer.

As the olefin monomer, an α-olefin having 2 to 8 carbon atoms is preferred, and specifically, examples thereof include ethylene, propylene, butylene, isobutylene, and 1-hexene.

Of these, ethylene and propylene are preferred.

Specifically, examples of the olefin-based resin include a polyethylene resin, such as very low density polyethylene (VLDPE, density: 880 kg/m$^3$ or more and less than 910 kg/m$^3$), low density polyethylene (LDPE, density: 910 kg/m$^3$ or more and less than 915 kg/m$^3$), medium density polyethylene (MDPE, density: 915 kg/m$^3$ or more and less than 942 kg/m$^3$), high density polyethylene (HDPE, density: 942 kg/m$^3$ or more), and linear low density polyethylene; a polypropylene resin (PP); a polybutene resin (PB); an ethylene-propylene copolymer; an olefin-based elastomer (TPO); an ethylene-vinyl acetate copolymer (EVA); and an olefin-based ternary copolymer, such as ethylene-propylene-(5-ethylidene-2-norbornene).

In one embodiment of the present invention, the olefin-based resin may also be a modified olefin-based resin obtained by further subjecting the olefin-based resin to at least one modification selected from acid modification, hydroxy group modification, and acrylic modification.

Examples of the acid-modified olefin-based resin obtained by subjecting the olefin-based resin to acid modification include a modified polymer obtained by subjecting the aforementioned non-modified-olefin-based resin to graft polymerization with an unsaturated carboxylic acid or an anhydride thereof.

Examples of the unsaturated carboxylic acid or its anhydride include maleic acid, fumaric acid, itaconic acid, citraconic acid, glutaconic acid, tetrahydrophthalic acid, aconitic acid, (meth)acrylic acid, maleic anhydride, itaconic anhydride, glutaconic anhydride, citraconic anhydride, aconitic anhydride, norbornene dicarboxylic acid anhydride, and tetrahydrophthalic anhydride.

The unsaturated carboxylic acid or its anhydride may be used alone or may be used in combination of two or more thereof.

Examples of the acrylic modified olefin-based resin obtained by subjecting the olefin-based resin to acrylic modification include a modified polymer obtained by subjecting the aforementioned non-modified olefin-based resin serving as a main chain to graft polymerization with an alkyl (meth)acrylate serving as a side chain.

The carbon number of the alkyl group which the alkyl (meth)acrylate has is preferably 1 to 20, more preferably 1 to 16, and still more preferably 1 to 12.

Examples of the alkyl (meth)acrylate include the same compounds as those which can be selected for the aforementioned monomer (a1').

Examples of the hydroxy group-modified olefin-based resin obtained by subjecting the olefin-based resin to hydroxy group modification include a modified polymer obtained by subjecting the aforementioned non-modified olefin-based resin serving as a main chain to graft polymerization with a hydroxy group-containing compound.

Examples of the hydroxy group-containing compound include the same hydroxy group-containing monomers which can be selected for the aforementioned monomer (a2').

A mass average molecular weight (Mw) of the olefin-based resin is preferably 2,000 to 1,000,000, more preferably 10,000 to 500,000, still more preferably 20,000 to 400,000, and yet still more preferably 50,000 to 300,000.

(Other Resin than Acrylic Urethane-Based Resin and Olefin-Based Resin)

In one embodiment of the present invention, the composition (y) may contain other resin than the acrylic urethane-based resin and the olefin-based resin within a range where the effects of the present invention are not impaired.

Examples of such a resin include a vinyl-based resin, such as polyvinyl chloride, polyvinylidene chloride, polyvinyl alcohol, an ethylene-vinyl acetate copolymer, and an ethylene-vinyl alcohol copolymer; a polyester-based resin, such as polyethylene terephthalate, polybutylene terephthalate, and polyethylene naphthalate; polystyrene; an acrylonitrile-butadiene-styrene copolymer; cellulose triacetate; a polycarbonate; a polyurethane not corresponding to the acrylic urethane-based resin; polymethylpentene; a polysulfone; polyether ether ketone; a polyether sulfone; polyphenylene sulfide; a polyimide-based resin, such as a polyether imide and a polyimide; a polyamide-based resin; an acrylic resin; and a fluorine-based resin.

However, from the viewpoint of more improving the interfacial adhesion between the layer (Y) and the layer (X), and/or the interfacial adhesion between the layer (Y) and the layer (Z), the content proportion of the other resin than the acrylic urethane-based resin and the olefin-based resin in the composition (y) is preferably small.

Specifically, the content proportion of the other resin than the acrylic urethane-based resin and the olefin-based resin is preferably less than 30 parts by mass, more preferably less than 20 parts by mass, still more preferably less than 10 parts by mass, yet still more preferably less than 5 parts by mass, and even yet still more preferably less than 1 part by mass base on 100 parts by mass of the total amount of the non-pressure-sensitive adhesive resin (y1) selected from the group consisting of the acrylic urethane-based resin and the olefin-based resin contained in the composition (y).

(Crosslinking Agent)

In one embodiment of the present invention, in the case where the composition (y) contains the acrylic urethane-based resin, it is more preferred to further contain a crosslinking agent in order to crosslink the acrylic urethane-based resin.

As the crosslinking agent, for example, an isocyanate-based compound serving as a crosslinking agent is preferred.

As the isocyanate-based compound serving as a crosslinking agent, various isocyanate-based compounds can be used so long as they react with the functional group of the acrylic urethane-based resin to form a crosslinking structure.

As the isocyanate-based compound, a polyisocyanate compound having two or more isocyanate groups per molecule is preferred.

Examples of the polyisocyanate compound include a diisocyanate compound, a triisocyanate compound, a tetraisocyanate compound, a pentaisocyanate compound, and a hexaisocyanate compound. More specifically, examples thereof include an aromatic polyisocyanate compound, such as tolylene diisocyanate, diphenylmethane diisocyanate, and xylylene diisocyanate; an alicyclic isocyanate compound, such as dicyclohexylmethane-4,4-diisocyanate, bicycloheptane triisocyanate, cyclopentylene diisocyanate, cyclohexylene diisocyanate, methylcyclohexylene diisocyanate, and hydrogenated xylylene diisocyanate; and an aliphatic isocyanate compound, such as pentamethylene diisocyanate, hexamethylene diisocyanate, heptamethylene diisocyanate, trimethylhexamethylene diisocyanate, and lysine diisocyanate.

A biuret product or isocyanurate product of such an isocyanate compound as well as a modified product, such as an adduct, that is a reaction product between such an isocyanate compound and a nonaromatic low-molecular weight active hydrogen-containing compound, such as ethylene glycol, trimethylolpropane, and castor oil, can also be used.

Of these isocyanate-based compounds, an aliphatic isocyanate compound is preferred; an aliphatic diisocyanate compound is more preferred; and pentamethylene diisocyanate, hexamethylene diisocyanate, and heptamethylene diisocyanate are still more preferred.

In the composition (y), the isocyanate-based compound may be used alone or may be used in combination of two or more thereof.

In the composition (y), as for the content proportion of the acrylic urethane-based resin and the isocyanate-based compound serving as the crosslinking agent, the content of the isocyanate-based compound serving as the crosslinking agent is preferably 1 to 30 parts by mass, more preferably 2 to 20 parts by mass, and still more preferably 3 to 15 parts by mass as expressed in terms of a solid content based on 100 parts by mass of the total of the acrylic urethane-based resin.

(Catalyst)

In one embodiment of the present invention, in the case where the composition (y) contains the acrylic urethane-based resin and the crosslinking agent, it is more preferred that the composition (y) further contains a catalyst together with the crosslinking agent.

As the catalyst, a metal-based catalyst is preferred, and a metal-based catalyst exclusive of a tin-based compound having a butyl group is more preferred.

Examples of the metal-based catalyst include a tin-based catalyst, a bismuth-based catalyst, a titanium-based catalyst, a vanadium-based catalyst, a zirconium-based catalyst, an aluminum-based catalyst, and a nickel-based catalyst. Of these, a tin-based catalyst or a bismuth-based catalyst is preferred, and a tin-based catalyst exclusive of a tin-based compound having a butyl group or a bismuth-based catalyst is more preferred.

The tin-based catalyst is an organometallic compound of tin, and examples thereof include a compound having a structure, such as an alkoxide, a carboxylate, and a chelate. Preferred examples thereof include an acetylacetone complex, an acetylacetonate, an octylic acid compound, or a naphthenic acid compound of such a metal.

Similarly, the bismuth-based catalyst, the titanium-based catalyst, the vanadium-based catalyst, the zirconium-based catalyst, the aluminum-based catalyst, or the nickel-based catalyst is an organometallic compound of bismuth, titanium, vanadium, zirconium, aluminum, or nickel, respectively, and examples thereof include a compound having a structure, such as an alkoxide, a carboxylate, and a chelate. Preferred examples thereof include an acetylacetone complex, an acetylacetonate, an octylic acid compound, or a naphthenic acid compound of such a metal.

Specific examples of the acetylacetone complex of a metal include acetylacetone tin, acetylacetone titanium, acetylacetone vanadium, acetylacetone zirconium, acetylacetone aluminum, and acetylacetone nickel.

Specific examples of the acetylacetonate include tin acetylacetonate, bismuth acetylacetonate, titanium acetylacetonate, vanadium acetylacetonate, zirconium acetylacetonate, aluminum acetylacetonate, and nickel acetylacetonate.

Specific examples of the octylic acid compound include bismuth 2-ethylhexylate, nickel 2-ethylhexylate, zirconium 2-ethylhexylate, and tin 2-ethylhexylate.

Specific example of the naphthenic acid compound include bismuth naphthenate, nickel naphthenate, zirconium naphthenate, and tin naphthenate.

As the tin-based catalyst, a tin compound represented by the general formula: $R_pSn(L)_{(4-p)}$ (in the general formula, R is an alkyl group having 1 to 25 carbon atoms, and preferably an alkyl group having 1 to 3 carbon atoms or 5 to 25 carbon atoms, or an aryl group; L is an organic group other than an alkyl group or an aryl group, or an inorganic group; and p is 1, 2, or 4) is preferred.

In the general formula: $R_pSn(L)_{(4-p)}$, the alkyl group represented by R is more preferably an alkyl group having 5 to 25 carbon atoms, and still more preferably an alkyl group having 5 to 20 carbon atoms; and though the aryl group represented by R is not particularly limited with respect to the carbon number, it is preferably an aryl group having 6 to 20 carbon atoms. In the case where two or more of plural R's are existent in one molecule, the R's may be the same as or different from each other.

L is preferably an aliphatic carboxylic acid having 2 to 20 carbon atoms, an aromatic carboxylic acid, or an aromatic sulfonic acid, and more preferably an aliphatic carboxylic acid having 2 to 20 carbon atoms. Examples of the aliphatic carboxylic acid having 2 to 20 carbon atoms include an aliphatic monocarboxylic acid having 2 to 20 carbon atoms and an aliphatic dicarboxylic acid having 2 to 20 carbon atoms. In the case where two or more of plural L's are existent in one molecule, the L's may be the same as or different from each other.

In the composition (y1), the catalyst may be used alone or may be used in combination of two or more thereof.

In the composition (y1), as for the content proportion of the acrylic urethane-based resin and the catalyst, the content of the catalyst is preferably 0.001 to 5 parts by mass, more preferably 0.01 to 3 parts by mass, and still more preferably 0.1 to 2 parts by mass as expressed in terms of a solid content based on 100 parts by mass of the total of the acrylic urethane-based resin.

(Additive)

In one embodiment of the present invention, the composition (y) may contain an additive within a range where the effects of the present invention are not impaired. For example, the composition may contain an additive for substrate, which is contained in a substrate which a general pressure-sensitive adhesive sheet has.

Examples of the additive for substrate include a UV absorber, a photostabilizer, an antioxidant, an antistatic agent, a slipping agent, and an anti-blocking agent.

These additives may be used alone or may be used in combination of two or more thereof.

In the case of containing such an additive, the content of the additive is preferably 0.0001 to 20 parts by mass, and more preferably 0.001 to 10 parts by mass based on 100 parts by mass of the non-pressure-sensitive adhesive resin.

(Diluent Solvent)

In one embodiment of the present invention, the composition (y) may contain, as a diluent solvent, water or organic solvent together with the aforementioned various active components, to form to a solution.

Examples of the organic solvent include the same materials as in the organic solvent which is used on preparing the aforementioned composition (x) in a solution form.

The diluent solvent which is contained in the composition (y) may be used alone or may be used in combination of two or more thereof.

In the case where the composition (y) contains the diluent solvent to form a solution, the concentrations of the active components of the composition (y) are each independently preferably 0.1 to 60% by mass, more preferably 0.5 to 50% by mass, and still more preferably 1.0 to 40% by mass.

<<Pressure-Sensitive Adhesive Layer (Z)>>

The pressure-sensitive adhesive layer (Z) is preferably a layer formed of a composition (z) containing a pressure-sensitive adhesive resin, and is more preferably a layer formed by drying a coating film (z') of a composition (z) containing a pressure-sensitive adhesive resin.

[Composition (z)]

The composition (z) that is a forming material for the pressure-sensitive adhesive layer (Z) contains a pressure-sensitive adhesive resin, and the pressure-sensitive adhesive resin may be the same as the pressure-sensitive adhesive resin for the composition (x) mentioned hereinabove, and a preferred embodiment and a preferred formulation (content) thereof are also the same as those of the latter.

However, the monomer (a1') for the acrylic resin of a preferred example of the pressure-sensitive adhesive resin to form the layer (Z) is preferably one or more selected from the group consisting of 2-ethylhexyl (meth)acrylate, methyl (meth)acrylate, ethyl (meth)acrylate and butyl (meth)acrylate, and more preferably one or more selected from the group consisting of 2-ethylhexyl (meth)acrylate and butyl (meth)acrylate. Similarly, the monomer (a2') for the acrylic resin of a preferred example of the pressure-sensitive adhesive resin to form the pressure-sensitive adhesive layer (Z) preferably contains both 2-hydroxyethyl (meth)acrylate and (meth)acrylic acid. Also similarly, the monomer (a3') for the acrylic resin of a preferred example of the pressure-sensitive adhesive resin to form the pressure-sensitive adhesive layer (Z) is preferably vinyl acetate. The acrylic resin of a preferred embodiment of the pressure-sensitive adhesive resin to form the pressure-sensitive adhesive layer (Z) may have or may not have a structural unit (a3) derived from the monomer (a3').

In one preferred embodiment of the present invention, the other component than the pressure-sensitive adhesive resin contained in the composition (z) may be appropriately controlled depending on the intended use of the peel detection label of the present invention.

For example, in one preferred embodiment of the present invention, from the viewpoint of controlling the peel strength to fall within a desired range, the composition (z) may further contain one or more selected from the group consisting of a tackifier and a crosslinking agent, and in addition to these, the composition may still further contain one or more selected from the group consisting of a diluent solvent and an additive for pressure-sensitive adhesive to be used in a general pressure-sensitive adhesive.

The tackifier, the crosslinking agent, the diluent solvent and the additive for pressure-sensitive adhesive to be used in a general pressure-sensitive adhesive may also be the same as those described hereinabove in the section of the composition (x), and a preferred embodiment and a preferred content thereof are also the same as those of the latter.

However, in one preferred embodiment of the present invention, the peel strength of the layer (XA) is preferably not lower than the peel strength of the layer (Z), as will be described hereinunder, and more preferably, the peel strength of the layer (XA) is higher than the peel strength of the layer (Z).

The peel strength of the layer (Z) is preferably 1.0 N/25 mm or more, more preferably 4.0 N/25 mm or more, even more preferably 9.0 N/25 mm or more, further more preferably 12.0 N/25 mm or more, and is preferably 40.0 N/25 mm or less, more preferably 30.0 N/25 mm or less, even more preferably 25.0 N/25 mm or less, further more preferably 18.0 N/25 mm or less.

In the case where the peel strength of the layer (Z) satisfies the range, and for example, in the case where the peel detection label has a release material, the peel detection label can more surely express the function of preventing pattern expression at the time when the peel detection label is peeled from the release material (hereinafter referred to as "prepeeling") and enabling pattern expression at the time when the peel detection label is peeled from an adherend, and hence, such is preferred.

In the case where the peel detection label has the layer (XA), preferably, the peel strength of the layer (XA) is larger than the peel strength of the layer (Z). When the peel strength of the layer (XA) is larger than the peel strength of the layer (Z), the troubles during peeling the peel detection label or before peeing the layer (Z) from an adherend are preferably effectively prevented. For example, undesired peeling at the interface between the support and/or the pattern layer and the layer (XA) and/or at the interlayer between the layer (XA) and its adjacent layer, this causing the pressure-sensitive adhesive laminate remain on the adherend to result in adhesive residue on the adherend, can be more effectively prevented from occurring, and hence, such is preferred. In addition, when the peel strength of the layer (XA) is larger than the peel strength of the layer (Z), such is also preferred since, for example, in production of the peel detection label by die cutting or by winding the peel detection label into a roll or unwinding the label, during the storage of the peel detection label, or at the time of prepeeling the peel detection label from a release material just before use, the interfacial peeling at a site differing from the intended site can be more effectively prevented from occurring.

Specifically, the peel strength of the layer (Z) can be measured according to the method described in the section of Examples.

The shear storage elastic modulus G' at 23° C. of the layer (Z) is preferably $1.5 \times 10^4$ Pa or more, more preferably $2.5 \times 10^4$ Pa or more, even more preferably $3.0 \times 10^4$ Pa or more, further more preferably $4.0 \times 10^4$ Pa or more, further more preferably $5.0 \times 10^4$ Pa or more, and is preferably $2.0 \times 10^5$ Pa or less, more preferably $1.0 \times 10^5$ Pa or less, even more preferably $8.0 \times 10^4$ Pa or less, further more preferably $7.0 \times 10^4$ Pa or less, further more preferably $6.0 \times 10^4$ Pa or less.

When the shear storage elastic modulus G' at 23° C. of the layer (Z) satisfies the range, the layer (Z) can fully deform with no breakage at the time of peeling the peel detection label and any trouble of adhesive residue can be more effectively prevented from occurring, and hence, such is preferred.

Specifically, the shear storage elastic modulus G' at 23° C. of the layer (Z) can be measured according to the method described in the section of Examples.

The peel strength and the shear storage elastic modulus G' at 23° C. of the layer (Z) can be controlled, for example, by controlling the choice of the kind of each component such as the pressure-sensitive adhesive resin to form the layer (Z), the tackifier, the crosslinking agent, and other additives for pressure-sensitive adhesive, and by controlling the content of each component.

(Coloring Agent)

As for the peel detection label, at least one layer selected from the layer (X), the layer (Y) and the layer (Z) may further contain a coloring agent, and in the case where at least one layer of the layer (X), the layer (Y) and the layer (Z) contains a coloring agent, preferably, the layer (Y) contains a coloring agent. The wording "in the case where at least one layer of the layer (X), the layer (Y) and the layer (Z) contains a coloring agent" means that, for example, in the case where the layer (X) is a laminate, at least one selected from each layer constituting the layer (X) may contain a coloring agent, and the same may apply to the layer (Y) and the layer (Z).

When at least one layer selected from the layer (X), the layer (Y) and the layer (Z) contains a coloring agent, the visibility of the peel detection pattern improves further, and the presence or absence of peeling of the peel detection label can be more readily detected. As compared with an embodiment where a vapor deposited metallic film layer or any other colored layer is provided between the layer (Y) and the layer (X) or where a vapor deposited metallic film layer or any other colored layer is provided between the layer (Y) and the layer (Z) for improving the pattern visibility, the case where at least one layer selected from the layer (X), the layer (Y) and the layer (Z) contains a coloring agent is preferred because it is unnecessary to consider the adhesiveness at the interface to these layers and the number of manufacturing steps at the time of production can be reduced. Similarly, from the viewpoint of reducing the influence on the peel strength of the layer (X) or the layer (Y), it is preferred that the layer (Y) contains the coloring agent.

In the case where the layer (X) is a laminate (Ln), one preferred embodiment of the case contains a coloring agent in any other layer than the layer (Xn) in contact with the layer (Y) in the layer (X), and for example, a more preferred embodiment contains a coloring agent in the layer (X1). In this case, the layer (Xn) in contact with the layer (Y) does not contain a coloring agent, and therefore the embodiment is preferred from the same viewpoint as that for the case where the layer (Y) contains a coloring agent. In this case, the layer (Y) may or may not contain a coloring agent.

As the coloring agent, any of a pigment and a dye may be used, with a pigment being preferred.

As the pigment, though any of an inorganic pigment and an organic pigment may be used, an organic pigment is preferred.

Examples of the inorganic pigment include carbon black and a metal oxide. In a black ink, carbon black is preferred.

Examples of the organic pigment include an azo pigment, a diazo pigment, a phthalocyanine pigment, a quinacridone pigment, an isoindolinone pigment, a dioxazine pigment, a perylene pigment, a perinone pigment, a thioindigo pigment, an anthraquinone pigment, and a quinophthalone pigment.

Examples of the dye include an acidic dye, a reactive dye, a direct dye, an oil-soluble dye, a disperse dye, and a cationic dye.

A hue is not particularly limited, and any of chromatic color pigments or dyes, such as yellow, magenta, cyan, blue, red, orange, and green colors, can be used.

The aforementioned coloring agents can be used alone or in admixture of two or more in an arbitrary ratio.

In the case where the aforementioned each layer contains these coloring agents, the content of the coloring agent is each independently preferably 0.1 to 40 parts by mass, more preferably 1.0 to 35 parts by mass, and still more preferably 5.0 to 30 parts by mass as expressed in terms of a solid content based on 100 parts by mass of the resin which each of the layers contains.

The pressure-sensitive adhesive laminate, in which the layer in contact with the layer (Y) in the layer (X) (when the layer (X) is a single layer, this is the layer (X), and when the layer (X) is a laminate (Ln), this is a layer (Xn)) is a layer (XA), is more preferably a pressure-sensitive adhesive laminate having a laminate formed by directly laminating a coating film (x') formed of a composition (x) of a forming material for the layer (XA) and a coating film (y') in that order and then simultaneously drying the coating film (x') and the coating film (y') to remove volatile components (for example, in the embodiment of FIG. 1, the laminate of the layer (X) 3 and the layer (Y) 4, and in the embodiment of FIG. 2, the laminate of the layer (X2) 32 and the layer (Y) 4), and still more preferably a pressure-sensitive adhesive laminate having a laminate formed by simultaneously applying a composition (x) and a composition (y) to directly laminate a coating film (x') and a coating film (y') in that order, and then simultaneously drying the coating film (x') and the coating film (y') to remove volatile components.

When the pressure-sensitive adhesive laminate is one having a laminate formed by directly laminating a coating film (x') and a coating film (y') in that order and then "simultaneously" drying the coating film (x') and the coating film (y'), the interfacial adhesion between the layer (X) and the layer (Y) becomes high as compared with that in the case of forming a layer in contact with the layer (Y) in the layer (X) on the previously formed layer (Y), and therefore, such is preferred from the viewpoint of more effectively preventing the adhesive residue from occurring. In the case where the layer in contact with the layer (Y) in the layer (X) is a layer (XA), it may be considered that this is caused due to the fact that during a process of simultaneously drying the coating film (x') composed of the composition (x) containing a pressure-sensitive resin that is a forming material for the layer (XA) in contact with the layer (Y) in the layer (X) and the coating film (y') composed of a composition (y) that is a forming material for the layer (Y), the molecular chains contained in the respective compositions are entangled with each other while causing a mixed layer in the vicinity of the interface, whereby the interfacial adhesion between the layer (X) and the layer (Y) is improved.

Furthermore, in the case of the pressure-sensitive adhesive laminate having a laminate formed by simultaneously applying the composition (x) containing a pressure-sensitive adhesive resin and the composition (y), a dry film of a thin film is hardly formed on the surface of each coating film as compared with the case of successively applying the respective compositions to form the pressure-sensitive adhesive laminate, and therefore, the adhesion between the respective layers is excellent. Thus, such is more preferred from the viewpoint of more effectively preventing the adhesive residue from occurring.

Similarly, the pressure-sensitive adhesive laminate, in which the layer in contact with the layer (Y) in the layer (X) is a layer (XA), is more preferably a pressure-sensitive adhesive laminate having a laminate formed by directly laminating a coating film (x') formed of a composition (x) of a forming material for the layer (XA), a coating film (y') and a coating film (z') in that order and then simultaneously drying the coating film (x'), the coating film (y') and the coating film (z') to remove volatile components (for example, in the embodiment of FIG. 1, the pressure-sensitive adhesive laminate 10 of the layer (X) 3, the layer (Y) 4 and the layer (Z) 5, and in the embodiment of FIG. 2, the laminate of the layer (X2) 32, the layer (Y) 4 and the layer (Z) 5). Still more preferably, the pressure-sensitive adhesive laminate, in which the layer in contact with the layer (Y) in the layer (X) is a layer (XA), is a pressure-sensitive adhesive laminate having a laminate formed by simultaneously applying a composition (x) of a forming material for the layer (XA), a composition (y) and a composition (z) to directly laminate a coating film (x'), a coating film (y') and a coating film (z') in that order, and then simultaneously drying the coating film (x'), the coating film (y') and the coating film (z') to remove volatile components.

By simultaneously applying the composition (x), the composition (y), and the composition (z), a dry film of a thin film is hardly formed on the surface of each coating film as compared with the case of successively applying the respective compositions, and therefore, the adhesion between the respective layers is excellent. Thus, such is more preferred from the viewpoint of more effectively preventing the adhesive residue from occurring.

From the same reason as the reason mentioned above, in the case where the pressure-sensitive adhesive laminate is one having a laminate formed by directly laminating the coating film (x'), the coating film (y'), and the coating film (z') in that order and then simultaneously drying the coating film (x'), the coating film (y'), and the coating film (z'), not only the interfacial adhesion between the layer (X) and the layer (Y) but also the interfacial adhesion between the layer (Z) and the layer (Y) becomes high as compared with that in the case of forming later the layer in contact with the layer (Y) in the layer (X) and the layer (Z) on the previously formed layer (Y), or the case of previously preparing a laminate of the layer in contact with the layer (Y) in the layer (X) or the layer (Z) and the layer (Y) by the aforementioned method and then forming either one of the remaining layer in contact with the layer (Y) in the layer (X) or the layer (Z) on the exposed surface of the layer (Y), and therefore, such is preferred from the viewpoint of more effectively preventing the adhesive residue from occurring.

Furthermore, in the case of the pressure-sensitive adhesive laminate having a laminate formed by simultaneously applying a composition (x), a composition (y), and a composition (z), a dry film of a thin film is hardly formed on the surface of each coating film as compared with the case of successively applying the respective compositions, and therefore, the adhesion between the respective layers is excellent. Thus, such is more preferred from the viewpoint of more effectively preventing the adhesive residue from occurring.

In the present invention, with respect to the pressure-sensitive adhesive laminate which the peel detection label has, or to each laminate having at least the layer (Y) that the pressure-sensitive adhesive laminate has, in the case of forming each layer from the coating film, the pressure-sensitive adhesive laminate is specified by the production method as mentioned above. However, in this case, there are such circumstances that the pressure-sensitive adhesive laminate cannot help being specified by the production method.

Namely, for example, as a method in which regarding a cross section in a thickness direction when cutting the surface of the layer (Y) of the laminate in a vertical direction, the interface between the layer (Y) and the layer (X) is observed with an electron microscope or the like, to judge whether or not the pressure-sensitive adhesive laminate has been formed on the basis of the method of the present invention from the viewpoint of being accompanied with subjective visual sensation, for example, a method of measuring a surface roughness may be considered. However, in the case of forming the respective layers by simultaneously drying the coating films, in particular, in the case of simultaneously applying the respective layers, followed by simultaneously drying, the roughness of the interface is fine, so that it cannot be precisely measured, and a difference in the roughness state depending upon a region to be observed is very large. Accordingly, the evaluation owing to specified physical properties values, such as surface roughness, is extremely difficult.

From the foregoing circumstances, in the present invention, there is a case where the pressure-sensitive adhesive laminate that the peel detection label has or each laminate having at least the layer (Y) that the pressure-sensitive adhesive laminate has cannot help being specified by the production method as mentioned above.

The same may apply to the relationship between the layer (Y) and the layer (X), as well as the relationship between the layer (Y) and the layer (Z) in the case of a laminate for the pressure-sensitive adhesive laminate formed by directly laminating the coating film (x'), the coating film (y') and the coating film (z') in that order and then simultaneously drying the coating film (x'), the coating film (y') and the coating film (z').

A thickness of the pressure-sensitive adhesive laminate (total thickness of the pressure-sensitive adhesive laminate) is preferably 2 to 100 μm, more preferably 4 to 80 μm, still more preferably 5 to 50 μm, yet still more preferably 10 to 40 μm, even yet still more preferably 15 to 35 μm.

A thickness (Xt) of the layer (X) is preferably 0.5 to 50.0 µm, more preferably 1.0 to 30.0 µm, still more preferably 2.0 to 20.0 µm, yet still more preferably 3.0 to 15.0 µm, and even yet still more preferably 4.0 to 12.0 µm.

In the case where the layer (X) is a laminate (Ln), a ratio of the thickness (X1t) of the layer (X1) to the thickness (Xnt) of the layer (Xn) [(X1t)/(Xnt)] is preferably 1/100 to 200/100, more preferably 2/100 to 150/200, even more preferably 3/100 to 100/100, further more preferably 5/100 to 50/100, further more preferably 8/100 to 20/100.

For example, in the case where the laminate (Ln) is a laminate (L2) composed of two layers, a ratio of the thickness (X1t) of the layer (X1) to the thickness (X2t) of the layer (X2) [(X1t)/(X2t)] is preferably 1/100 to 200/100, more preferably 2/100 to 150/100, even more preferably 3/100 to 100/100, further more preferably 5/100 to 50/100, further more preferably 8/100 to 20/100.

A thickness (Yt) of the layer (Y) is preferably 0.5 to 50.0 µm. When the thickness (Yt) of the layer (Y) is 0.5 µm or more, it is considered that the layer (Y) could hardly be broken when the peel detection label is peeled, and therefore both more excellent pattern expressibility and adhesive residue prevention could be readily satisfied. When the thickness (Yt) of the layer (Y) is 50.0 µm or less, the peeling angle on peeling the peel detection label can be small, and therefore the stress of peeling the interface between the support and the pattern layer can be readily transmitted to the pattern layer side to thereby better the pattern expressibility. From these viewpoints, the thickness (Yt) of the layer (Y) is more preferably 1.0 to 30.0 µm, even more preferably 2.0 to 20.0 µm, further more preferably 2.5 to 15.0 µm, further more preferably 3.0 to 12.0 µm, further more preferably 3.0 to 9.0 µm.

In this description, a sum total thickness (total thickness) of the pressure-sensitive adhesive laminate is a value as measured with a constant pressure thickness gauge in conformity with JIS K6783-1994, Z1702-1994, and Z1709-1995, and specifically, it can be measured on the basis of the method described in the section of Examples.

The thickness of each of the layers constituting the pressure-sensitive adhesive laminate may be measured by the same method as in the total thickness of the pressure-sensitive adhesive laminate as mentioned above. And the thickness can also be, for example, measured by the method described in the section of Examples. In specifically, the thickness may also be calculated from the total thickness of the pressure-sensitive adhesive laminate obtained by the method as mentioned above, and a thickness ratio of each of the layers measured by observing a cross section of the pressure-sensitive adhesive laminate cut in a thickness direction thereof using a scanning electron microscope.

In the peel detection label, a ratio of the thickness (Xt) of the layer (X) to the thickness (Yt) of the layer (Y) [(Xt)/(Yt)] is preferably 20/100 to 500/100, more preferably 80/100 to 400/100, even more preferably 180/100 to 300/100.

In the peel detection label, a ratio of the thickness (Zt) of the layer (Z) to the thickness (Yt) of the layer (Y) [(Zt)/(Yt)] is preferably 10/100 to 500/100, more preferably 100/100 to 400/100, even more preferably 200/100 to 300/100.

In the case where the peel detection label has the above mentioned other pressure-sensitive adhesive layer (Wt) (t is an integer of 1 or more) or the intermediate layer (M), the thickness of each of these layers is not particularly limited independently so long as the effects of the present invention are attained.

As for the pressure-sensitive adhesive laminate, on forming the pressure-sensitive adhesive laminate, as mentioned above, in the case where the coating film (x') and the coating film (y') are simultaneously dried to remove volatile components, thereby forming the pressure-sensitive adhesive laminate having the layer (X) and the layer (Y), there is a case where a mixed layer is caused between the coating films of the layer (X) and the layer (Y) in the drying process of the coating films, and the interface between the layer (X) and the layer (Y) becomes unclear to an extent that it vanishes.

In the case where a mixed layer is caused between the respective coating films and between the formed layers, for example, in the case where on observing a cross section of the pressure-sensitive adhesive laminate cut in a thickness direction thereof by using a scanning electron microscope, to measure the ratios of the respective layers, a mixed layer is caused between the layer (X) and the layer (Y), the thickness ratios of the respective layers may be measured on the assumption that an interface exists on a surface passing through an intermediate point in the thickness direction of the mixed layer and parallel to the surface at the opposite side to the layer (Y) of the layer (X). The same may also apply to the case where a mixed layer is caused between the layer (X) and the layer (Y). In addition, the same may also apply to the case where a mixed layer is caused between constituent layers constituting each layer, for example between the layer (X1) and the layer (X2) in the layer (X1)

<Release Material>

As mentioned above, for example, when the embodiment shown in FIG. 1 or FIG. 2 is concerned, from the viewpoint of handling properties, the peel detection label that is one embodiment of the present invention may be a configuration in which a release material is further provided on the adhesive surface 10*a* or 11*a* of the pressure-sensitive adhesive laminate. In addition, in any case of the embodiment of FIG. 1 or FIG. 2, the peel detection label may have a configuration in which a release material is further provided on the surface of the support 1 at the opposite side to the layer (X), thereby sandwiching the support 1 by two sheets of the release materials. In the case of using two sheets of the release materials, the respective release materials may be the same as or different from each other.

As the release material, a release sheet having been subjected to a double-sided release treatment, or a release sheet having been subjected to a single-sided release treatment is used, and one prepared by applying a release agent on a substrate for release material is exemplified.

Examples of the substrate for release material include a paper, such as a wood-free paper, a glassine paper, and a kraft paper; and a plastic film, such as a polyester resin film made of a polyethylene terephthalate resin, a polybutylene terephthalate resin, a polyethylene naphthalate resin, and an olefin resin film made of a polypropylene resin, and a polyethylene resin.

Examples of the release agent include a silicone-based resin, an olefin-based resin, a rubber-based elastomer of an isoprene-based resin, a butadiene-based resin, etc., a long-chain alkyl-based resin, an alkyd-based resin, and a fluorine-based resin.

In the case of using the release material on the adhesive surface of the pressure-sensitive adhesive laminate, a release material having a release strength such that the pattern layer is not expressed when prepeeling the release material from the peel detection label, for example, one having a release strength controlled such that the interfacial peeling does not occur between the support and the pattern layer, and/or between the pattern layer and the layer (X), is preferred.

As a method for effectively preventing the interfacial peeling from occurring at the time of prepeeling the release material from the peel detection label, there is exemplified the aforementioned method for subjecting the support surface to satin finish processing. Although the means of regulating the release strength of the release material and the method of satin finish processing may be each adopted alone or may be adopted in combination, it is more preferred that the both are adopted in combination.

Although a thickness of the release material is not particularly limited, it is preferably 10 to 200 μm, more preferably 25 to 170 μm, still more preferably 30 to 125 μm, and yet still more preferably 50 to 100 μm.

[Production Method for Peel Detection Label]

As for a production method for the peel detection label, for example, the peel detection label can be produced by preparing a support having a pattern layer formed according to the aforementioned method on one surface of the support (hereinafter also referred to as a "pattern layer-provided support", and further forming the aforementioned pressure-sensitive adhesive laminate on the support on the side thereof on which the pattern layer is provided.

As for a forming method for the pressure-sensitive adhesive laminate, the following method is exemplified. In the following description, a case of producing one example of the configuration of the peel detection label of FIG. 1 and FIG. 2 is described.

In the case of the peel detection label 101 shown in FIG. 1, a support 1 on which a pattern layer 2 is formed according to various printing methods is prepared, for example, as described in the section of describing the peel detection label.

Then, on the surface of the pattern layer-provided support on which the pattern layer 2 is formed, the layer (X) 3 is formed so as to cover the pattern layer 2. The layer (X) 3 is preferably a layer (XA) formed of a composition (x) containing a pressure-sensitive adhesive resin. For example, the layer may be formed by heat-melting a composition (x) and extrusion-laminating on the surface of the pattern layer-provided support on which the pattern layer 2 is formed, or may be formed by later applying a coating film (x') formed of a composition (x) containing a pressure-sensitive adhesive resin on the surface of the pattern layer-provided support on which the pattern layer 2 is formed, followed by drying.

Subsequently, on the surface of the formed layer (X) 3 on the side opposite to the pattern layer-provided support, a layer (Y) 4 is formed. In the case of forming the layer (Y) 4, for example, raw materials for forming the layer (Y) 4 may be heat-melted and extrusion-laminated on the layer (X) 3. Alternatively, the layer (Y) 4 may be formed by later applying a coating film (y') made of a composition (y) on the layer (X) 3, followed by drying. In addition, for example, as for the layer (Y) 4, one having been previously subjected to extrusion molding or prepared by drying a coating film (y') may be directly stuck to the layer (X) 3.

As mentioned above, in the case of forming the laminate of the layer (X) 3 and the layer (Y) 4, it is preferred to form a laminate by directly laminating a coating film (x') and a coating film (y') in that order on the surface of the pattern layer-provided support on which the pattern layer 2 is formed and then simultaneously drying the coating film (x') and the coating film (y'), to remove volatile components. It is more preferred to form the laminate by simultaneously applying a composition (x) and a composition (y) on the surface of the pattern layer-provided support on which the pattern layer 2 is formed, to directly laminate a coating film (x') and a coating film (y') in that order, and then simultaneously drying the coating film (x') and the coating film (y'), to remove volatile components.

Subsequently, on the surface of the formed layer (Y) 4 on the side opposite to the layer (X) 3, a layer (Z) 5 is formed. In the case of forming the layer (Z) 5, for example, a composition (z) containing a pressure-sensitive adhesive resin may be heat-melted and extrusion-laminated on the layer (Y) 4. Alternatively, the layer may be formed by later applying a coating film (z') made of a composition (z) on the layer (Y) 4, followed by drying. In addition, for example, as for the layer (Z) 5, one having been previously subjected to extrusion molding or prepared by drying a coating film (z') may be directly stuck to the layer (Y) 4.

As another method for forming the layer (Y) 4 on the surface of the formed layer (X) 3 on the side opposite to the pattern layer-provided support, there may be adopted a method in which a laminate in which a layer (Z) 5 is formed on either one surface of the layer (Y) 4 having been previously subjected to extrusion molding or prepared by drying a coating film (y') in the aforementioned method is previously prepared, and the exposed surface of the layer (Y) 4 of the laminate is directly stuck to the layer (X) 3.

As another method for forming the layer (Y) 4 on the surface of the formed layer (X) 3 on the side opposite to the pattern layer-provided support, there may be adopted a method in which a layer (Z) 5 is formed on a previously separately prepared release material, a laminate in which a layer (Y) 4 is formed on the surface of the layer (Z) 5 on the side opposite to the release material by the aforementioned method is previously prepared, and the exposed surface of the layer (Y) 4 of the laminate is directly attached onto the exposed surface of the layer (X) 3.

As mentioned above, in the case of forming a laminate of a layer (Z) 5 and a layer (Y) 4, it is preferred to form the laminate by directly laminating a coating film (z') and a coating film (y') in that order and then simultaneously drying the coating film (z') and the coating film (y'), to remove volatile components. It is more preferred to form the laminate by simultaneously applying a composition (z) and a composition (y) to directly laminate a coating film (z') and the coating film (y') in that order, and then simultaneously drying the coating film (z') and the coating film (y'), to remove volatile components.

As mentioned above, in the case of forming a pressure-sensitive adhesive laminate 10 formed of a layer (X) 3, a layer (Y) 4 and a layer (Z) 5, it is more preferred to form a laminate by directly laminating a coating film (x'), a coating film (y'), and a coating film (z') in that order on the surface of the pattern layer-provided support on which the pattern layer 2 is formed, and then simultaneously drying the coating film (x'), the coating film (y'), and the coating film (Z), to remove volatile components. It is still more preferred to form the pressure-sensitive adhesive laminate 10 by simultaneously applying a composition (x), a composition (y), and a composition (z) on the surface of the pattern layer-provided support on which the pattern layer 2 is formed, to directly laminate the coating film (x'), the coating film (0, and the coating film (z') in that order, and then simultaneously drying the coating film (x'), the coating film (y'), and the coating film (z'), to remove volatile components.

On forming the pressure-sensitive adhesive laminate 10, it is preferred to form the layer (X) 3 so as to completely cover the pattern layer 2.

In the case of producing the peel detection label 102 shown in FIG. 2, as mentioned above, the support 1 in which the pattern layer 2 has been previously formed is prepared.

Then, on the surface of the pattern layer-provided support on which the pattern layer 2 is formed, the layer (X1) 31 is formed so as to cover the pattern layer 2. The method for forming the layer (X1) 31 is not specifically limited so far as the method can form the layer (X1) 31 on the support 1 and the pattern layer 2. For example, similarly to the method for forming the pattern layer 2 mentioned above, the layer (X1) 31 can be formed by using an ink containing the aforementioned raw material and solvent by a printing method, for example, gravure printing, screen printing, offset printing or flexographic printing. In the case where the layer (X1) 31 is the aforementioned layer (XQ) and where an energy ray-curable resin is used, preferably, the printed layer is cured with energy ray. Regarding the kind thereof, the energy ray includes UV ray and/or electron beam, and UV ray is preferred. The light source includes a high-pressure mercury lamp, a metal halide lamp, and a UV-LED.

In the case where the layer (X1) 31 is the layer (XA) or the layer (XQ) formed of a composition (x) containing a pressure-sensitive adhesive resin, for example, the layer (X1) 31 may be formed by heat-melting a composition (x1) containing a raw material resin for the layer (X1) 31 followed by extrusion molding it onto the surface of the pattern layer-provided support on the side on which the pattern layer 2 is formed, or may be formed by later applying a coating film (x1') made of the composition (x1) on the surface of the pattern layer-provided support on which the pattern layer 2 is formed and then drying.

Subsequently, on the exposed surface of the formed layer (X1) 31 on the side opposite to the support 1, a layer (X2) 32 is formed. Preferably, the layer (X2) 32 is a layer (XA) formed of a composition (x) containing a pressure-sensitive adhesive resin, and in this case, the layer can be formed according to the same method as that for the layer (X) 3 in the peel detection label 101 shown in FIG. 1.

Subsequently, on the surface of the formed layer (X2) 32 on the side opposite to the pater layer-provided support, a layer (Y) 4 is formed. On forming the layer (Y) 4, the same method as that for forming the layer (Y) 4 in the peel detection label 101 in FIG. 1 can be employed.

Also as mentioned above, in the case of forming a laminate of the layer (X2) 32 and the layer (Y) 4, the same method as that for forming the laminate of the layer (X) 3 and the layer (Y) 4 in the peel detection label 101 shown in FIG. 1 can be employed.

In the case where the layer (X1) 31 is a layer (XA) or a layer (XQ) and is formed of a resin composition, a laminate can be formed by directly laminating a coating film (x1') of a composition (x1) containing a raw material resin for the layer (X1) 31, a coating film (x2') of a composition (x2) containing a raw material resin for the layer (X2) 32 and a coating film (y') of a composition (y) in that order, on the surface of the pattern layer-provided support on which the pattern layer 2 is formed, followed by simultaneously drying the coating film (x1'), the coating film (x2') and the coating film (y') to remove volatile components. Similarly, the laminate can be formed by simultaneously applying a composition (x1), a composition (x2) and a composition (y) onto the surface of the pattern layer-provided support on which the pattern 2 is formed to form a coating film (x1'), a coating film (x2') and a coating film (y') in that order by direct lamination thereon, followed by simultaneously drying the coating film (x1'), the coating film (x2') and the coating film (y') to remove volatile components.

Subsequently, on the surface of the formed layer (Y) 4 opposite to the layer (X) 3, a layer (Z) 5 is formed. In the case of forming the layer (Z) 5, the same method as that for forming the layer (Z) 5 in the peel detection label 101 of FIG. 1 can be employed.

In the case where the layer (X1) 31 is also the layer (XA) or a layer formed of a resin composition containing a non-pressure-sensitive adhesive resin, a laminate may be formed by directly laminating a coating film (x1') formed of a composition (x1) containing a raw material resin for the layer (X1) 31, a coating film (x2') of a composition (x2) containing a raw material resin for the layer (X2) 32, a coating film (y') of a composition (y) and a coating film (z') of a composition (z) in that order on the surface of the pattern layer-provided support on which the pattern layer 2 is formed, followed by simultaneously drying the coating film (x1'), the coating film (x2'), the coating film (y') and the coating film (z') to remove volatile components. Similarly, the laminate can be formed by simultaneously applying a composition (x1), a composition (x2), a composition (y) and a composition (z) onto the surface of the pattern layer-provided support on which the pattern 2 is formed to form a coating film (x1'), a coating film (x2'), a coating film (y') and a coating film (z') in that order by direct lamination thereon, followed by simultaneously drying the coating film (x1'), the coating film (x2'), the coating film (y') and the coating film (z') to remove volatile components.

In the embodiment of FIG. 2 where the pressure-sensitive adhesive laminate 11 is formed, preferably, the layer (X1) 31 is formed to completely cover the pattern layer 2.

On successively forming the aforementioned respective coating films, examples of a coater which is used for application of each of the composition include a spin coater, a spray coater, a bar coater, a knife coater, a roll coater, a knife roll coater, a blade coater, a gravure coater, a curtain coater, and a die coater.

As a coater which is used on simultaneously applying the respective compositions, a multilayer coater is exemplified. Specifically, examples thereof include a multilayer curtain coater and a multilayer die coater. Of these, from the viewpoint of operability, a multilayer die coater is preferred.

From the viewpoint of making it easy to form each of the coating films and improving the productivity, it is preferred that the respective compositions each independently further contain a diluent solvent.

As the diluent solvent, the aforementioned diluent solvents described in the section of the peel detection label can be used.

The concentration of the active components of the solution obtained by blending the diluent solvent in each of the compositions is the same as mentioned above in the section of the peel detection label.

In the aforementioned production process, in the case of successively applying the plural coating films and then simultaneously drying them, prior to the simultaneous drying treatment, a pre-drying treatment may be performed to an extent such that after forming at least one coating film, a curing reaction of the coating film does not proceed.

For example, the pre-drying treatment may be performed at every time of forming each coating film of the coating film (x') and the coating film (y'), or after forming two layers of the coating films of the coating film (x') and the coating film (y'), the two layers may be simultaneously subjected to the pre-drying treatment. In the case of performing the pre-drying, from the viewpoint of making the interfacial adhesion between the layer (X) and the layer (Y) more favorable, it is preferred that after forming two layers of the coating films of the coating film (x') and the coating film (y'), the foregoing two layers are simultaneously subjected to the pre-drying treatment.

Although a drying temperature on performing the pre-drying treatment is in general appropriately set within a temperature range to an extent that curing of the formed coating film does not proceed, it is preferably lower than the drying temperature on performing the simultaneous drying treatment. A specific drying temperature is, for example, preferably 10 to 45° C., more preferably 10 to 34° C., and still more preferably 15 to 30° C.

A drying temperature on simultaneously drying the plural coating films is, for example, preferably 60 to 150° C., more preferably 70 to 145° C., still more preferably 80 to 140° C., and yet still more preferably 90 to 135° C.

[Use of Peel Detection Label]

In the case of using the peel detection label, as mentioned above, since the adhesive residue on the adherend does not occur, the peel detection label can be suitably used for an application in which on peeling the peel detection label at the time when peeling is required, occurrence of adhesive residue on the adherend is not desired, and peel detection is needed.

There are supposed applications, such as tampering prevention of labeling state of an automobile component, an electric/electronic compartment, a precision machine; packing or opening prevention of an improper article in forwarding or packaging of an article; a sealing label for warrant of virginity of contents of a pharmaceutical product, a cosmetic product, a food product; prevention of the presence or absence of peeling or the presence or absence of tampering of an identification or certification label of various certificates, such as a passport, or product certificates; prevention for improper opening and closing of various switching apertures equipped in transportation means, such as various vehicles, aircrafts, trains, and ships (for example, prevention of incorporation of an improper foreign matter into a carry-in entrance, a fuel tank); and security measures for prevention of improper invasion into transportation means, such as various vehicles, aircrafts, trains, and ships or prevention of improper invasion into various buildings.

The peel detection label can be used upon attachment onto the object (adherend) in such an application, and on peeling from the adherend, as mentioned above, interfacial peeling occurs between the support and the pattern layer, whereby the presence or absence of peeling of the peel detection label from the adherend becomes visually detectable.

EXAMPLES

The present invention is more specifically described by reference to the following Examples, but it should be construed that the present invention is not limited to the following Examples. Physical properties values in the following Production Examples and Examples are values as measured by the following methods.

<Mass Average Molecular Weight (Mw)>

The measurement was performed by using a gel permeation chromatograph (a product name: "HLC-8020", manufactured by Tosoh Corporation) under the following condition, and a value as measured and expressed in terms of standard polystyrene was adopted.

(Measurement Condition)

Column: "TSK guard column HXL-L", "TSK gel G2500HXL", "TSK gel G2000HXL", and "TSK gel G1000HXL" (all of which are manufactured by Tosoh Corporation) connected in series Column temperature: 40° C.
Development solvent: Tetrahydrofuran
Flow rate: 1.0 mL/min <Measurement of Glass Transition Point>

The measurement was performed at a temperature rise rate of 20° C./min by using a differential calorimeter (a product name: "DSC Q2000", manufactured by TA Instruments Japan Inc.) in conformity with JIS K7121.

<Thicknesses of Support, Pattern Layer, Pressure-Sensitive Adhesive Laminate, and Peel Detection Label>

The measurement was performed by using a constant pressure thickness gauge, manufactured by TECLOCK Co., Ltd. (Mode No.: "PG-02J", standard description: in conformity with JIS K6783-1994, Z1702-1994, and Z1709-1995).

With respect to the thickness of the pattern layer, on the way of preparing a peel detection label serving as an object of the measurement, after measuring a total thickness in a place at which the support and the pattern layer were laminated in a state of the pattern layer-provided support having the pattern layer formed on the support, a value obtained by subtracting the thickness of the previously measured support from the aforementioned total thickness was designated as "thickness of pattern layer".

With respect to the thickness of the pressure-sensitive adhesive laminate, after measuring a total thickness of a peel detection label serving as an object of the measurement, a value obtained by subtracting the thickness of the previously measured support (however, in a place at which the pattern layer was not laminated) from the aforementioned total thickness was designated as "thickness of pressure-sensitive adhesive laminate").

The total thickness of the peel detection label was measured as a value resulting from removal of the release material on the pressure-sensitive adhesive layer (Z).

<Thickness Ratio of Each Layer in Pressure-Sensitive Adhesive Laminate>

On the attachment surface of the pressure-sensitive adhesive layer (Z) of the peel detection label prepared in each of the Examples and Comparative Examples, a polyethylene terephthalate (PET) film (a trade name: "DIAFOIL (registered tradename) T-100", manufactured by Mitsubishi Chemical Corporation, thickness: 50 μm) was stuck, to prepare a measurement sample.

A cross section in a thickness direction when cutting the surface of the pressure-sensitive adhesive layer (Z) of the measurement sample in a vertical direction was observed with a scanning electron microscope (a product name: "S-4700", manufactured by Hitachi, Ltd.), and a ratio of the thickness (thickness ratio) of each of the low modulus layer (X), the high modulus layer (Y), and the pressure-sensitive adhesive layer (Z) to a total thickness of the low modulus layer (X), the high modulus layer (Y), and the pressure-sensitive adhesive layer (Z) was measured.

In Examples 3 and 6, the thickness of each layer of the layer (x1) and the layer (X2) in the low modulus layer (X) was measured in the same manner as above. A ratio of the thickness (X1t) to the thickness (X2t) in the layer (x1), when taking the thickness (X2t) of the layer (X2) as 100, is shown in Table 1.

The thickness of each of the "layers was calculated from the measured value of the "thickness of pressure-sensitive adhesive laminate" as measured by the aforementioned method on the basis of the thickness ratio of each layer. The thickness ratio of each layer, when taking the thickness (Yt) of the layer (Y) as 100, is shown in Table 1.

<Shear Storage Elastic Modulus G' at 23° C. of Low Modulus Layer (X) and Pressure-sensitive Adhesive Layer (Z)>

The shear storage elastic modulus G' at 23° C. of the low modulus layer (X) and the pressure-sensitive adhesive layer (Z) was measured according to the following method.

A test sample having a diameter of 8 mm and a thickness of 3 mm formed from a composition the same as the composition forming a layer serving as an object of the measurement was prepared. Using a viscoelasticity measuring device (a device name: "MCR300", manufactured by Anton Paar GmbH), the shear storage elastic modulus G' of the test sample at 23° C. was measured by the torsional shear method under a condition of test start temperature: −20° C., test finish temperature: 150° C., temperature rise rate: 3° C./min, and frequency: 1 Hz.

In Examples 3 and 6, the shear storage elastic modulus G' at 23° C. of each layer of the layer (X1) and the layer (X2) in the low modulus elastic layer (X) was measured according to the same method.

<Thickness-Average Shear Storage Elastic Modulus of Low Modulus Layer (X)>

The thickness-average shear storage elastic modulus of the low modulus layer (X) was measured according to the following method.

Using the value of the shear storage elastic modulus G' (Xk) at 23° C. of each layer in the low modulus layer (X) determined according to the aforementioned measurement method, and the value of the thickness ratio T (Xk) of each layer, the thickness-average shear storage elastic modulus of the low modulus layer (X) was calculated according to the following expression (1).

$$\sum_{k=1}^{n} (G'(Xk) \times T(Xk)) \tag{1}$$

In the expression (1), G'(Xk) represents a shear storage elastic modulus G' at 23° C. of the k'th layer (Xk) from the support side in the low modulus layer (X); T(Xk) represents a thickness ratio of the layer (Xk)=thickness of layer (Xk)/total thickness of low modulus layer (X); and n represents an integer of 1 to 10.

Specifically, in the case of Example 3, the thickness-average shear storage elastic modulus of the low modulus layer (X) was determined according to the following calculation.

Thickness-average shear storage elastic modulus of low modulus layer (X)={G'(X1)×T(X1)}+{G'(X2)×T(X2)}={shear storage elastic modulus G' at 23° C. of layer (X1)×thickness ratio of layer (X1)}+{shear storage elastic modulus G' at 23° C. of layer (X2)×thickness ratio of layer (X2)}={6.44×10$^5$ (Pa)×1 (μm)/11 (μm)}+{6.57× 10$^4$ (Pa)×10 (μm)/11 (μm)}=1.18×10$^5$ (Pa)

<Tensile Storage Elastic Modulus E' at 23° C. of High Modulus Layer (Y)>

The tensile storage elastic modulus E' at 23° C. of the high modulus layer (Y) was measured according to the following method.

(In the case of a sample having a value of a tensile storage elastic modulus E' at 23° C. of more than 100 MPa)

Using a dynamic viscoelasticity automatic measuring device (a product name: RHEOVIBRON (registered trademark) DDV-01FD, manufactured by Orientec Corporation), a test sample which was separately prepared from a composition the same as the composition forming a layer serving as an object of the measurement and cut in a size of 30 mm in the MD direction×5 mm in the TD direction×200 μm in thickness was measured for a tensile storage elastic modulus E' at 23° C. by the tensile method under a condition of test start temperature: −50° C., test finish temperature: 200° C., temperature rise rate: 3° C./min, amplitude: 5 μm, and frequency: 1 Hz.

The wording "MD" in the MD direction is an abbreviation of the Machine Direction, and the MD direction means a longitudinal direction at the time of peel detection label molding. In addition, the wording "TD" in the TD direction is an abbreviation of the Transverse Direction, and the TD direction means a width direction at the time of peel detection label molding. Here, the "MD direction" in the high modulus layer (Y) refers to the direction in which the composition was applied on forming a coating film.

In the case where the tensile storage elastic modulus E' at 23° C. measured according to the measurement method is not more than 100 MPa, the tensile storage elastic modulus E' at 23° C. was measured according to the following method.

(In the Case of a Sample Having a Value of a Tensile Storage Elastic Modulus E' at 23° C. of not More than 100 MPa)

A test sample having a diameter of 8 mm and a thickness of 3 mm formed from the same composition as forming a layer to be measured was prepared. Using a viscoelasticity measuring device (a device name: "MCR300", manufactured by Anton Paar GmbH), the shear storage elastic modulus G' at 23° C. of the test sample was measured by the torsional shear method under a condition of test start temperature: −20° C., test finish temperature: 150° C., temperature rise rate: 3° C./min, and frequency: 1 Hz.

A value of the tensile storage elastic modulus E' at 23° C. was calculated from the value of the shear storage elastic modulus G' at 23° C. according to an approximate expression: E'=3G'.

<Peel Strength of Pressure-Sensitive Adhesive Layer (XA) and Pressure-Sensitive Adhesive Layer (Z)>

The peel strength of each of the pressure-sensitive adhesive layer (XA) and the pressure-sensitive adhesive layer (Z) was measured by adopting the following method.

Procedure (1): A pressure-sensitive adhesive layer having a thickness of 25 μm, which was formed of a composition the same as the composition for forming a pressure-sensitive adhesive layer serving as an object of the measurement was provided on a polyethylene terephthalate (PET) film having a thickness of 25 pin and cut in a size of 300 mm in length (MD)×25 mm in width (TD), thereby preparing a test piece.

Procedure (2): The surface of the test piece on the side on which the pressure-sensitive adhesive layer was exposed was attached onto a stainless steel sheet (SUS304, polished with #360) in an environment at 23° C. and 50% RH (relative humidity), followed by allowing to stand for 24 hours in the same environment.

Procedure (3): After the procedure (2), the measurement result obtained by measuring the peel strength of the pressure-sensitive adhesive layer in an environment at 23° C. and 50% RH (relative humidity) by the 180° peeling method on the basis of JIS Z0237:2000 at a tensile speed (peeling speed) of 300 mm/min was designated as the peel strength of the pressure-sensitive adhesive layer serving as an object.

Production Example 1

(Preparation of Composition (x-a))

In 100 parts by mass (solid content ratio) of, as a pressure-sensitive adhesive resin, an acrylic copolymer (1) (acrylic copolymer having a structural unit derived from raw material monomers composed of n-butyl acrylate (BA)/acrylic acid (AAc)=90.0/10.0 (mass ratio), mass average molecular weight (Mw): 600,000, diluent solvent: ethyl acetate, solid content concentration: 30% by mass), 1.5 parts by mass (solid content ratio) of, as a crosslinking agent, an isocyanate-based crosslinking agent (a product name: "CORONATE L", manufactured by Tosoh Corporation) was blended and mixed, and the mixture was further diluted with ethyl acetate and uniformly stirred, thereby preparing a composition (x-a) having a solid content concentration (active component concentration) of 25% by mass.

Production Example 2

(Preparation of Composition (x-b))

In 100 parts by mass (solid content ratio) of, as a pressure-sensitive adhesive resin, an acrylic copolymer (2) (acrylic copolymer having a structural unit derived from raw material monomers composed of n-butyl acrylate (BA)/acrylic acid (AAc)=90.0/10.0 (mass ratio), mass average molecular weight (Mw): 410,000, diluent solvent: ethyl acetate, solid content concentration: 37% by mass), 0.74 parts by mass (solid content ratio) of, as a crosslinking agent, an aluminum chelate-based crosslinking agent (a product name: "M-5A", manufactured by Soken Chemical & Engineering Co., Ltd., solid content concentration=4.95% by mass) was blended and mixed, and the mixture was further diluted with ethyl acetate and uniformly stirred, thereby preparing a composition (x-b) having a solid content concentration (active component concentration) of 30% by mass.

Production Example 3

(Preparation of Composition (x-c))

In 100 parts by mass (solid content ratio) of, as a pressure-sensitive adhesive resin, an acrylic copolymer (3) (acrylic copolymer having a structural unit derived from raw material monomers composed of n-butyl acrylate (BA)/methyl methacrylate (MMA)/vinyl acetate (VAc/2-hydroxyethyl acrylate (2HEA)=80.0/10.0/9.0/1.0 (mass ratio), mass average molecular weight (Mw): 1,000,000, diluent solvent: ethyl acetate, solid content concentration: 45% by mass), 25 parts by mass (solid content ratio) of, as a tackifier, a hydrogenated rosin-based resin (a product name: "KE-359", manufactured by Arakawa Chemical Industries Ltd., softening point: 94 to 104° C.) and, as a crosslinking agent, 1.62 parts by mass (solid content ratio) of an isocyanate-based crosslinking agent (a product name: "TAKENATE D-110N", manufactured by Mitsui Chemicals, Inc.) were blended and mixed, and the mixture was further diluted with toluene and uniformly stirred, thereby preparing a composition (x-c) having a solid content concentration (active component concentration) of 40% by mass.

Production Example 4

(Preparation of Composition (x-d))

In 100 parts by mass (solid content ratio) of, as a pressure-sensitive adhesive resin, an acrylic copolymer (4) (acrylic copolymer having a structural unit derived from raw material monomers composed of n-butyl acrylate (BA)/2-ethylhexyl acrylate (2EHA)/acrylic acid (AAc)/2-hydroxyethyl acrylate (2HEA)=47.0/47.0/5.5/0.5 (mass ratio), mass average molecular weight (Mw): 550,000, diluent solvent: ethyl acetate, solid content concentration: 40% by mass), 2 parts by mass (solid content ratio) of, as a crosslinking agent, an isocyanate-based crosslinking agent (a product name: "CORONATE L", manufactured by Tosoh Corporation) was blended and mixed, and the mixture was further diluted with toluene and uniformly stirred, thereby preparing a composition (x-d) having a solid content concentration (active component concentration) of 30% by mass.

Production Example 5

(Preparation of Composition (y-a))

(1) Synthesis of Linear Urethane Prepolymer (UY)

In a reaction vessel in a nitrogen atmosphere, isophorone diisocyanate was blended in 100 parts by mass (solid content ratio) of polycarbonate diol having a mass average molecular weight (Mw) of 1,000 in an equivalent ratio of the hydroxy group of polycarbonate diol and the isocyanate group of isophorone diisocyanate of 1/1. 160 parts by mass of toluene was further added, and the mixture was allowed to react at 80° C. for 6 hours or more in a nitrogen atmosphere while stirring until the isocyanate group concentration reached a theoretical amount.

Subsequently, a solution of 1.44 parts by mass (solid content ratio) of 2-hydroxyethyl methacrylate (2-HEMA) diluted in 30 parts by mass of toluene was added, and the mixture was further allowed to react at 80° C. for 6 hours until the isocyanate group on the both ends vanished, thereby obtaining a linear urethane prepolymer (UY) having a mass average molecular weight (Mw) of 29,000.

(2) Synthesis of Acrylic Urethane-Based Resin (II)

In a reaction vessel in a nitrogen atmosphere, 100 parts by mass (solid content ratio) of the linear urethane prepolymer (UY) obtained in the above (1), 117 parts by mass (solid content ratio) of methyl methacrylate (MMA), 5.1 parts by mass (solid content ratio) of 2-hydroxyethyl methacrylate (2-HEMA), 1.1 parts by mass (solid content ratio) of 1-thioglycerol, and 50 parts by mass of toluene were added, and the temperature was raised to 105° C. while stirring.

In the aforementioned reaction vessel, a solution of 2.2 parts by mass (solid content ratio) of a radical initiator (a trade name: "ABN-E", manufactured by Japan Finechem Company, Inc.) diluted with 210 parts by mass of toluene was dropped over 4 hours while keeping at 105° C.

After completion of dropping of the solution, the resultant was allowed to react at 105° C. for 6 hours, thereby obtaining a solution of an acrylic urethane-based resin (II) having a mass average molecular weight (Mw) of 105,000.

(3) Preparation of Composition (y-a)

In 100 parts by mass (solid content ratio) of the solution of the acrylic urethane-based resin (II) obtained in the above (2), that is a non-pressure-sensitive adhesive resin (y1), 6.3 parts by mass (solid content ratio) of, as a crosslinking agent, a hexamethylene diisocyanate-based crosslinking agent (a product name: "CORONATE HL", manufactured by Tosoh Corporation) and, as a catalyst, 1.4 parts by mass (solid content ratio) of dioctyltin bis(2-ethylhexanoate) were blended and mixed, and the mixture was further diluted with toluene and uniformly stirred, thereby preparing a composition (y-a) having a solid content concentration (active component concentration) of 30% by mass.

Production Example 6

(Preparation of Composition (y-b))

A solution of an acid-modified olefin-based resin (a product name: "UNISTOLE H-200", manufactured by Mitsui Chemicals, Inc., mass average molecular weight (Mw): 145,000, glass transition point: −53° C., diluent solvent: mixed solvent of methylcyclohexane and methyl ethyl ketone, solid content concentration (active component concentration): 20% by mass), that is a non-pressure-sensitive adhesive resin (y1), was used as composition (y-b).

Production Example 7

(Preparation of Composition (y-c))

In 100 parts by mass (solid content ratio) of the solution of the acrylic urethane-based resin (II) obtained in Production Example 5, that is a non-pressure-sensitive adhesive resin (y1), 6.3 parts by mass (solid content ratio) of, as a crosslinking agent, a hexamethylene diisocyanate-based crosslinking agent (a product name: "CORONATE HL", manufactured by Tosoh Corporation), as a catalyst, 1.4 parts by mass (solid content ratio) of dioctyltin bis(2-ethylhexanoate), and, as a coloring agent, 27.9 parts by mass (solid content ratio) of copper phthalocyanine blue (manufactured by Nikko Bics Co., Ltd.) were blended and mixed, thereby obtaining a mixture. The mixture was further diluted with toluene and uniformly stirred, thereby preparing a composition (y-c) having a solid content concentration (active component concentration) of 30% by mass.

Production Example 8

(Preparation of Composition (z))

In the same manner as in Production Example 4, a composition (z) having a solid content concentration (active component concentration) of 30% by mass was prepared. The composition (z) is the same as the composition (x-d).

Details of pattern layer-provided supports and a release agent used in the following Examples and Comparative Examples are shown below.

Pattern layer-provided support (1): One prepared by gravure-printing a letter pattern "VOID" (the pattern layer had an area of 38% in 100% of the area of the surface of the support on which the pattern layer was formed) on the satin-finished surface of a one-sided satin-finished polyethylene terephthalate film (produced by satin-finishing one surface of "LUMIRROR (registered tradename)" (manufactured by Toray Industries, Inc.) by means of sand mat processing, thickness: 38 μm) by using a resin solution containing an acrylic resin (acrylic polymer composed of methyl methacrylate as a main monomer) and drying to form a pattern layer having a thickness of 5

Release material: A product name: "SP-8LK Blue", manufactured by Lintec Corporation, thickness: 88 μm, which is prepared by coating a glassine paper with a polyolefin and then subjecting to silicone release processing.

Example 1

(1) Formation of Coating Film

On the pattern layer-formed surface of the pattern layer-provided support (1), a coating film (x-a') of the composition (x-a) prepared in Production Example 1 was formed, and a coating film (y-a') of the composition (y-a) prepared in Production Example 5 and a coating film (z') of the composition (z) prepared in Production Example 8 were simultaneously applied and simultaneously formed on the coating film (x-a') and the coating film (y-a'), respectively, by using a multilayer die coater (width: 250 mm).

Application rates and application amounts of the respective compositions for forming the coating film (x-a'), the coating film (y-a'), and the coating film (z') were controlled so as to obtain a thickness of a pressure-sensitive adhesive laminate and a thickness of each of the layers (low modulus layer (X), high modulus layer (Y) and pressure-sensitive adhesive layer (Z)) as shown in Table 1.

(2) Drying Treatment

The formed coating film (x-a'), coating film (y-a'), and coating film (z') were simultaneously dried at a drying temperature of 125° C. for 60 seconds, thereby forming a pressure-sensitive adhesive laminate in which the support, the pattern layer, the low modulus layer (X) (as a single layer, this is expressed as first pressure-sensitive adhesive layer (X1) in Table 1), the high modulus layer (Y) and the pressure-sensitive adhesive layer (Z) were directly laminated in that order from the side of the support.

Then, on the surface of the exposed pressure-sensitive adhesive layer (Z), the previously prepared release material as mentioned above was laminated to obtain a peel detection label.

Example 2

A peel detection label was obtained by adopting the same method as in Example 1, except for using the composition (x-b) prepared in Production Example 2 in place of the composition (x-a).

Example 3

(1) Formation of Layer (X1) in Low Modulus Layer (X)

A UV-curable ink as a composition (x-e) (a product name: "UV 161 Beni S", manufactured by T & K TOKA Corporation) was gravure-printed on the entire surface of the patter layer-provided support (1) on which the patter layer was formed, thereby forming a coating film (x-e'), and the ink was cured by irradiation with UV ray from a high-pressure mercury lamp to form a layer (X1) having a thickness of 1 μm.

(2) Formation of Coating Films to be Layer (X2) in Low Modulus Layer (X), High Modulus Layer (Y) and Pressure-sensitive Adhesive Layer (Z)

Next, a coating film (x-c') of the composition (x-c) prepared in Production Example 3 was formed on the surface of the layer (X1) opposite to the support side. Then, a coating film (y-a') of the composition (y-a) prepared in Production Example 5 on the coating film (x-c'), and a coating film (z') of the composition (z) prepared in Production Example 8 on the coating film (y-a') were simultaneously formed by simultaneous coating by using a multilayer die coater (width: 250 mm).

Application rates and application amounts of the respective compositions for forming the coating film (x-c'), the coating film (y-a'), and the coating film (z') were controlled so as to obtain a thickness of a pressure-sensitive adhesive laminate and a thickness of each of the layers (layer (X2) in low modulus layer (X), high modulus layer (Y) and pressure-sensitive adhesive layer (Z)) as shown in Table 1.

(3) Drying Treatment

The formed coating film (x-c'), coating film (y-a'), and coating film (z') were simultaneously dried at a drying temperature of 125° C. for 60 seconds, thereby forming a pressure-sensitive adhesive laminate in which the support, the pattern layer, the layer (X1) in the low modulus layer (X), the layer (X2) in the low modulus layer (X), the high modulus layer (Y) and the pressure-sensitive adhesive layer (Z) were directly laminated in that order from the side of the support.

Then, on the surface of the exposed pressure-sensitive adhesive layer (Z), the previously prepared release material as mentioned above was laminated to obtain a peel detection label. In Example 3, the layer (X2) is a pressure-sensitive adhesive layer (XA).

Examples 4 to 6

Peel detection labels were produced according to the same method as in Examples 1 to 3 except that the composition (y-b) prepared in Production Example 6 was used in place of the composition (y-a).

Examples 7 to 8

Peel detection labels were produced according to the same method as in Examples 1 to 2 except that the composition (y-c) prepared in Production Example 7 was used in place of the composition (y-a).

Comparative Example 1

A peel detection label was produced according to the same method as in Example 1 except that the composition (x-c) prepared in Production Example 3 was used in place of the composition (x-a).

Comparative Example 2

A peel detection label was produced according to the same method as in Example 1 except that the composition (x-d) prepared in Production Example 4 was used in place of the composition (x-a).

The thickness of the pressure-sensitive adhesive laminate which the peel detection label produced in each of Examples and Comparative Examples had, and the thickness (thickness ratio between each layer) of each of the layer (X1) in the low modulus layer (X), the layer (X2) (if any) in the low modulus layer (X), the high modulus layer (Y) and the pressure-sensitive adhesive layer (Z) all constituting the pressure-sensitive adhesive laminate, as well as the shear storage elastic modulus G' and the tensile storage elastic modulus E' at 23° C. and the thickness-average shear storage elastic modulus of each layer, and the peel strength of each layer were measured according to the aforementioned methods. The measurement results are shown in Table 1.

TABLE 1

| | Pressure-sensitive Adhesive Laminate | | | | | | |
|---|---|---|---|---|---|---|---|
| | Layer Configuration of Pressure-sensitive Adhesive Laminate | | | | Thickness Ratio between Each Layer | | Total Thickness |
| | Layer (X1) | Layer (X2) | Layer (Y) | Layer (Z) | (Xt):(Yt):(Zt) | (X1t):(X2t) | [μm] |
| Example 1 | Composition (x-a) | — | Composition (y-a) | Composition (z) | 200:100:250 | — | 28 |
| Example 2 | Composition (x-b) | — | Composition (y-a) | Composition (z) | 200:100:250 | — | 28 |
| Example 3 | Composition (x-e) | Composition (x-c) | Composition (y-a) | Composition (z) | 220:100:250(*1) | 10:100 | 29 |
| Example 4 | Composition (x-a) | — | Composition (y-b) | Composition (z) | 200:100:250 | — | 28 |
| Example 5 | Composition (x-b) | — | Composition (y-b) | Composition (z) | 200:100:250 | — | 28 |
| Example 6 | Composition (x-e) | Composition (x-c) | Composition (y-b) | Composition (z) | 220:100:250(*1) | 10:100 | 29 |
| Example 7 | Composition (x-a) | — | Composition (y-c) | Composition (z) | 200:100:250 | — | 28 |
| Example 8 | Composition (x-b) | — | Composition (y-c) | Composition (z) | 200:100:250 | — | 28 |
| Comparative Example 1 | Composition (x-c) | — | Composition (y-a) | Composition (z) | 200:100:250 | — | 28 |
| Comparative Example 2 | Composition (x-d) | — | Composition (y-a) | Composition (z) | 200:100:250 | — | 28 |

| | Pressure-sensitive Adhesive Laminate | | | | | | |
|---|---|---|---|---|---|---|---|
| | Shear Storage Elastic Modulus G' [×10$^5$ Pa] | | | Thickness-average Shear Storage Elastic Modulus of Layer (X) [×10$^5$ Pa] | Tensile Storage Elastic Modulus E' of Layer (Y) [MPa] | Peel Strength [N/25 mm] | |
| | Layer (X1) | Layer (X2) | Layer (Z) | | | Layer (XA) | Layer (Z) |
| Example 1 | 1.11 | — | 0.548 | 1.11 | 250.8 | 21.0 | 15.2 |
| Example 2 | 1.68 | — | 0.548 | 1.68 | 250.8 | 20.0 | 15.2 |
| Example 3 | 6.44 | 0.657 | 0.548 | 1.18 | 250.8 | 20.8 | 15.2 |
| Example 4 | 1.11 | — | 0.548 | 1.11 | 18.2 | 21.0 | 15.2 |
| Example 5 | 1.68 | — | 0.548 | 1.68 | 18.2 | 20.0 | 15.2 |
| Example 6 | 6.44 | 0.657 | 0.548 | 1.18 | 18.2 | 20.8 | 15.2 |
| Example 7 | 1.11 | — | 0.548 | 1.11 | 204.2 | 21.0 | 15.2 |

TABLE 1-continued

| | | | | | | | |
|---|---|---|---|---|---|---|---|
| Example 8 | 1.68 | — | 0.548 | 1.68 | 204.2 | 20.0 | 15.2 |
| Comparative Example 1 | 0.657 | — | 0.548 | 0.657 | 250.8 | 20.8 | 15.2 |
| Comparative Example 2 | 0.548 | — | 0.548 | 0.548 | 250.8 | 15.2 | 15.2 |

(*1) The value (Xt) in the value (Xt):(Yt):(Zt) in Example 3 is a total value of the thickness (X1t) of the layer (X1) and the thickness (X2t) of the layer (X2).

With respect to the peel detection labels produced in Examples and Comparative Examples, various physical properties and properties were measured and evaluated according to the following methods. The results are shown in Table 2.

<Peel Strength of Peel Detection Label>

A test sample was prepared by cutting the peel detection label produced in each of Examples and Comparative Examples in a size of 200 mm in length (MD direction)×25 mm in width (TD direction) and further removing the release material from the pressure-sensitive adhesive layer (Z).

The exposed surface of the pressure-sensitive adhesive layer (Z) of the test sample was press-bonded on an acrylic painted plate (a product name: "SPCC-SD", acrylic painted (one face/white), manufactured by Paltec Co., Ltd.; size: 150 mm in length×70 mm in width×0.4 mm in thickness) serving as an adhered, using a 2-kg rubber roll with one reciprocation of the roll in an environment at 23° C. and 50% RH B: In 100% of the total area of the surface having the pattern layer formed thereon, the pattern appeared in an area of 50% or more and less than 80%.

C: In 100% of the total area of the surface having the pattern layer formed thereon, the pattern appeared in an area of 30% or more and less than 50%.

D: In 100% of the total area of the surface having the pattern layer formed thereon, the pattern appeared in an area of less than 30%.

F: The pattern did not appear.

(Evaluation Criteria of Adhesive Residue)

A: The adhesive residue (transfer) onto the adherend did not occur.

F: The adhesive residue (transfer) onto the adherend occurred.

TABLE 2

| | Tensile Speed: 300 mm/min, Peeling Angle: 180° | | | Tensile Speed: 300 mm/min. Peeling Angle: 90° | | | Tensile Speed: 50 mm/min. Peeling Angle: 90° | | | Tensile Speed: 10 mm/min, Peeling Angle: 90° | | |
|---|---|---|---|---|---|---|---|---|---|---|---|---|
| | Peel Strength [N/25 mm] | Pattern Expressibility | Adhesive Residue | Peel Strength [N/25 mm] | Pattern Expressibility | Adhesive Residue | Peel Strength [N/25 mm] | Pattern Expressibility | Adhesive Residue | Peel Strength [N/25 mm] | Pattern Expressibility | Adhesive Residue |
| Example 1 | 11.3 | A | A | 7.1 | A | A | 6.5 | A | A | 5.5 | A | A |
| Example 2 | 8.8 | A | A | 5.7 | A | A | 7.5 | A(*2) | A | 5.3 | A(*2) | A |
| Example 3 | 5.3 | A | A | 4.7 | A | A | 3.1 | A | A | 2.3 | A | A |
| Example 4 | 11.9 | A | A | 7.4 | A | A | 7.1 | A | A | 5.9 | A | A |
| Example 5 | 9.5 | A | A | 6.2 | A | A | 7.8 | A | A | 5.8 | A(*2) | A |
| Example 6 | 5.6 | A | A | 5.0 | A | A | 3.5 | A | A | 2.5 | A | A |
| Example 7 | 11.5 | A | A | 7.3 | A | A | 6.7 | A | A | 5.6 | A | A |
| Example 8 | 8.9 | A | A | 5.9 | A | A | 7.7 | A(*2) | A | 5.3 | A(*2) | A |
| Comparative Example 1 | 5.3 | A | A | 4.4 | A | A | 2.6 | D | A | 1.4 | F | A |
| Comparative Example 2 | 5.0 | A | A | 4.6 | A | A | 3.2 | D | A | 2.3 | F | A |

(*2) The expressibility was good, but the resin around the pattern was also stretched and extended.

(relative humidity) and then allowed to stand for 24 hours in the same environment.

After allowing to stand for 24 hours, the peel detection label was peeled by a 90° peeling method or a 180° peeling method at a tensile speed shown in Table 2 to measure the peel strength of the peel detection label according to JIS Z0237:2000.

<Evaluation of Pattern Expressibility and Adhesive Residue>

The sample of the peel detection label whose peel strength had been measured in the above was visually checked for the pattern expressibility of the peel detection label after peeling and for the presence or absence of adhesive residue on the adherend, according to the following criteria. The pattern expressibility was evaluated according to the following criteria.

(Evaluation Criteria for Pattern Expressibility)

A: In 100% of the total area of the surface having the pattern layer formed thereon, the pattern appeared in an area of 80% or more.

As shown in Table 2, it was confirmed that the peel detection labels produced in Examples 1 to 8 had excellent pattern expressibility even when peeled under a lower speed condition of 50 mm/min and 10 mm/min, in addition to peeling at 300 m/min, and further, these labels were free from adhesive residue on adherend. Further, it was also confirmed that the expressed letters of "VOID" had a massive texture. This is considered because the surface of the support on the side on which the pattern layer was formed was processed for satin finish. From this point, it was confirmed that the pattern was expressed owing to interfacial peeling between the support and the pattern layer, that is, the aforementioned requirement (1) was also satisfied. Further, it was confirmed that, in the peel detection labels of Examples 1, 3, 4, 6 and 7, the resin around the pattern was hardly stretched and therefore the pattern form was hardly broken so that the intended pattern form was well maintained even when peeled at the aforementioned low speed condition, as compared with the other Examples.

On the other hand, the peel detection labels of Comparative Examples 1 and 2 could have good pattern expressibility and were free from adhesive residue on adherend on peeling at 300 mm/min. However, in the peel detection labels of Comparative Examples 1 and 2, the thickness-average shear storage elastic modulus of the layer (X) was less than $8.0 \times 10^4$ Pa, and therefore, on peeling under a low speed condition of 50 mm/min and 10 mm/min, it was confirmed that the pattern expressibility of these comparative peel detection labels was extremely poor.

INDUSTRIAL APPLICABILITY

The peel detection label of the present invention is free from adhesive residue and exhibits excellent pattern expressibility even when peeled at a low speed, and is therefore useful as a peel detection label which is used for detection of the presence or absence of opening and closing of various containers, detection of the presence or absence of peeling or the presence or absence of tampering of peeling labels for identification or certification of various certificates such as passports and product certificates, or detection of any unreasonable invasion into various vehicles and building structures.

REFERENCE SIGNS LIST

101, 102: Peel detection label
1: Support
2: Pattern layer
3: Low modulus layer (X)
4: High modulus layer (Y)
5: Pressure-sensitive adhesive layer (Z)
10, 11: Pressure-sensitive adhesive laminate
1a: Surface of support
2a: Surface of pattern layer
10a, 11a: Adhesive surface of pressure-sensitive adhesive laminate
31: First layer (X1) in low modulus layer (X)
32: Second layer (X2) in low modulus layer (X)
40: Adherend
50: Void formed on peeling peel detection label from adherend

The invention claimed is:

1. A peel detection label that is a laminate comprising a support, a pattern layer formed in a part of a surface of the support, and a pressure-sensitive adhesive laminate comprising a low modulus layer (X), a high modulus layer (Y) and a pressure-sensitive adhesive layer (Z) in that order,
wherein the low modulus layer (X) comprises an n-layered structure (where n is an integer of 1 to 10) having a first surface in contact with the support and the pattern layer, and a second surface in contact with the high modulus layer (Y),
a thickness-average shear storage elastic modulus of the low modulus layer (X), as represented by the following expression (1), is $8.0 \times 10^4$ Pa or more and $6.0 \times 10^5$ Pa or less:

$$\sum_{k=1}^{n} (G'(Xk) \times T(Xk)) \quad (1)$$

where G'(Xk) represents a shear storage elastic modulus G' at 23° C. of the k'th layer (Xk) from the support side in the low modulus layer (X); T(Xk) represents a thickness ratio of the layer (Xk)=thickness of layer (Xk)/total thickness of low modulus layer (X); and n represents an integer of 1 to 10, and
when the pressure-sensitive adhesive layer (Z) of the peel detection label is attached onto an adherend and then peeled from the adherend, interfacial peeling occurs between the support and the pattern layer, whereby the presence or absence of peeling of the peel detection label from the adherend becomes visually detectable.

2. The peel detection label according to claim 1, wherein a tensile storage modulus E' at 23° C. of the high modulus layer (Y) is 10 MPa or more and 800 MPa or less.

3. The peel detection label according to claim 1, wherein the surface of the support at the side on which the pattern layer is formed is a surface subjected to satin finish processing.

4. The peel detection label according to claim 1, wherein at least one of the first surface and the second surface of the low modulus layer (X) has pressure-sensitive adhesiveness.

5. The peel detection label according to claim 1, wherein the low modulus layer (X) is a laminate (L2) comprising a first layer (X1) and a second layer (X2), and the first layer (X1) is in contact with the surface of the support and the pattern layer, and the second layer (X2) is in contact with the high modulus layer (Y).

6. The peel detection label according to claim 5, wherein a shear storage elastic modulus G' at 23° C. of the first layer (X1) constituting the low modulus layer (X) is larger than a shear storage elastic modulus G' at 23° C. of the second layer (X2).

7. The peel detection label according to claim 5, wherein a ratio (X1t)/(X2t) of a thickness (X1t) of the first layer (X1) to a thickness (X2t) of the second layer (X2) is 1/100 to 200/100.

8. The peel detection label according to claim 1, wherein the low modulus layer (X) comprises a pressure-sensitive adhesive layer (XA).

9. The peel detection label according to claim 8, wherein the pattern layer and the pressure-sensitive adhesive layer (XA) each comprises a same kind of resin.

10. The peel detection label according to claim 8,
wherein the pattern layer is a layer formed of a composition containing at least one selected from the group consisting of an acrylic resin, a urethane-based resin, an acrylic urethane-based resin, and a polyester-based resin, and
the pressure-sensitive adhesive layer (XA) is a layer formed of a composition (x) comprising a pressure-sensitive adhesive resin that comprises at least one selected from the group consisting of an acrylic resin, a urethane-based resin, an acrylic urethane-based resin and a polyester-based resin.

11. The peel detection label according to claim 1, wherein the high modulus layer (Y) is a layer formed of a composition (y) comprising at least one non-pressure-sensitive adhesive resin (y1) selected from the group consisting of an acrylic urethane-based resin and an olefin-based resin.

12. The peel detection label according to claim 1, wherein at least one of the low modulus layer (X), the high modulus layer (Y) and the pressure-sensitive adhesive layer (Z) comprises a coloring agent.

13. The peel detection label according to claim 1, wherein a ratio (Zt)/(Yt) of a thickness (Zt) of the pressure-sensitive adhesive layer (Z) to a thickness (Yt) of the high modulus layer (Y) is 10/100 to 500/100.

14. The peel detection label according to claim 1, wherein a ratio (Xt)/(Yt) of a thickness (Xt) of the low modulus layer (X) to a thickness (Yt) of the high modulus layer (Y) is 20/100 to 500/100.

* * * * *

UNITED STATES PATENT AND TRADEMARK OFFICE
CERTIFICATE OF CORRECTION

PATENT NO.         : 11,479,695 B2
APPLICATION NO.    : 17/258640
DATED              : October 25, 2022
INVENTOR(S)        : Yumiko Amino It is certified that error appears in the above-identified patent and that said Letters Patent is hereby corrected as shown below:

On the Title Page

Item (73), the Assignee's name is misspelled. Item (73) should read:
--(73) Assignee: LINTEC CORPORATION, Itabashi-ku (JP)--

Signed and Sealed this
Seventh Day of March, 2023

Katherine Kelly Vidal
*Director of the United States Patent and Trademark Office*